(12) United States Patent
Kadota

(10) Patent No.: US 6,223,716 B1
(45) Date of Patent: May 1, 2001

(54) FUEL CONTROL SYSTEM FOR CYLINDER INJECTION TYPE INTERNAL COMBUSTION ENGINE

(75) Inventor: Yoichi Kadota, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/452,870

(22) Filed: Dec. 2, 1999

Related U.S. Application Data

(62) Division of application No. 09/163,911, filed on Oct. 1, 1998.

(30) Foreign Application Priority Data

Apr. 16, 1998 (JP) ................................................ 10-106570

(51) Int. Cl.$^7$ ................................................ F02B 17/00
(52) U.S. Cl. ...................... 123/295; 303/114.3
(58) Field of Search ....................... 123/295, 399, 123/568.11, 568.21; 701/70; 60/411; 303/114.3; 477/205, 206

(56) References Cited

U.S. PATENT DOCUMENTS

| | | | |
|---|---|---|---|
| 3,763,974 | 10/1973 | Neal | 477/182 |
| 3,792,760 | 2/1974 | Haas | 477/182 |
| 3,792,761 | 2/1974 | Ball et al. | 477/182 |
| 3,792,762 | 2/1974 | Ball et al. | 477/182 |
| 3,799,303 | 3/1974 | Stoltman | 477/206 |
| 4,192,278 | 3/1980 | Iizuka et al. | 477/205 X |
| 4,224,791 | 9/1980 | Ostwald | 477/186 X |
| 5,152,587 | * 10/1992 | Volz | 303/114 |
| 5,614,666 | 3/1997 | Hara et al. | 701/295 |
| 5,826,559 | * 10/1998 | Ichimoto et al. | 123/295 |
| 5,846,164 | * 12/1998 | Harada | 477/205 |
| 5,915,357 | 6/1999 | Harada | |
| 5,950,595 | * 9/1999 | Yoshioka et al. | 123/295 |

FOREIGN PATENT DOCUMENTS 41 30 853 A1   4/1992   (DE).

* cited by examiner

*Primary Examiner*—Henry O. Yuen
*Assistant Examiner*—Mahmoud M Gimie
(74) *Attorney, Agent, or Firm*—Sughrue, Mion, Zinn, Macpeak & Seas, PLLC

(57) ABSTRACT

A fuel control system for a cylinder injection type internal combustion engine which can avoid frequent changeover of engine control mode and ensure a sufficient vacuum level for a brake operating pressure while protecting against degradation combustibility and fuel-consumption performance of the engine without resorting to additional provision of a special circuit or device. The system includes an intake air flow sensor (2) for detecting an intake air quantity (Qa) fed to an internal combustion engine (1) for thereby outputting a corresponding information signal, a crank angle sensor (5) for detecting a rotation speed (rpm) (Ne) of the engine (1) and a crank angle thereof to thereby output a corresponding information signal (SGT), and a pressure sensor (17) for detecting a brake operating pressure (PB). A control unit (8B) of the fuel control system is so designed or programmed as to compare a vacuum level of the brake operating pressure (PB) with a predetermined level (PTH1) corresponding to a permissible upper limit value of the vacuum level to thereby control the engine (1) in a mode conforming to the engine operating state when the vacuum level of the brake operating pressure (PB) is lower than the predetermined level (PTH1), whereas when the vacuum level of the brake operating pressure (PB) becomes equal to or higher than the predetermined level (PTH1), the control unit (8B) controls the engine (1) in a stoichiometric mode to thereby allow the vacuum level of the brake operating pressure (PB) to be sustained lower than the predetermined level (PTH1).

7 Claims, 14 Drawing Sheets

FUEL CONTROL SYSTEM FOR CYLINDER INJECTION TYPE INTERNAL COMBUSTION ENGINE

This is a divisional of application Ser. No. 09/163,911 filed Oct. 1, 1998, the disclosure of which is incorporated herein by reference.

BACKGROUND OF THE INVENTION

1. Field of the Invention

The present invention relates generally to a fuel control system for a cylinder injection type internal combustion engine (also known as the direct fuel injection type engine) for a motor vehicle in which fuel is injected directly into engine cylinders to control engine output torque. More particularly, the present invention is concerned with a fuel control system for the cylinder injection type internal combustion engine which system is so designed as to ensure brake operating pressure while protecting positively combustion performance or combustibility of the engine against degradation.

2. Description of Related Art

In general, in the internal combustion engine employed as the automobile engine or the like, an injector for fuel injection is installed within an intake manifold of an intake pipe of the engine so that the fuel as injected can be charged into engine cylinders together with the intake air.

For having better understanding of the principle underlying the invention, technical background thereof will be described in some detail. FIG. 10 is a schematic diagram showing a conventional fuel control system for an internal combustion engine in which a fuel injector is disposed within an intake pipe.

Referring to FIG. 10, an engine 1 constituting a main body of the internal combustion engine system includes a plurality of cylinders. However, for simplification of the illustration, only one of the cylinders is representatively shown in FIG. 10.

An intake pipe 1a is communicated to an exhaust pipe 1b through combustion chambers of the engine 1 to which a crank shaft 1c is coupled at one end thereof.

The intake pipe or manifold 1a serves for charging a mixture of intake air and fuel (hereinafter also referred to as the air-fuel mixture) into the engine 1, while the exhaust pipe 1b is used for discharging the exhaust gas resulting from the combustion of the air-fuel mixture within the engine 1. The crank shaft 1c is driven rotationally by the engine 1. Cooling water 1d forced to flow around the engine 1 serves for cooling the engine 1.

An air flow sensor 2 installed at an inlet port of the intake pipe 1a measures intake air quantity Qa as the information concerning the air flow rate or amount of air supplied to the engine 1. Furthermore, mounted within the intake pipe 1a is a throttle valve 3 which is operatively coupled to an accelerator pedal (not shown) operated by a driver of the motor vehicle for regulating the intake air quantity Qa in dependence on the magnitude of depression stroke of the accelerator pedal.

For the purpose of detecting angular position of the throttle valve 3, i.e., throttle opening degree θ of the throttle valve 3, a throttle position sensor 4 is provided in association with the throttle valve 3.

Further provided in association with the crank shaft 1c is a crank angle sensor 5 which is designed for detecting rotation speed (rpm) of the crank shaft 1c to thereby output a pulse signal in synchronism with the rotation of the crank shaft 1c. This signal will be referred to as the crank angle signal SGT. Thus, the crank angle signal SGT carries the information concerning the rotation speed (rpm) of the engine 1 as well as the information concerning the angular position of the crank shaft 1c (i.e., crank angle).

Temperature Tw of the cooling water 1d is detected by a water temperature sensor 6 which thus can serve as a means for detecting a warmed-up state of the engine 1.

An $O_2$-sensor 7 provided in association with the exhaust pipe 1b is designed to detect an oxygen concentration Do of the exhaust gas discharged from the engine 1 to the exhaust pipe 1b.

For the purpose of controlling operations of the internal combustion engine system described above, a control unit 8 is provided, which may be implemented in the form of a microprocessor or microcomputer. The detection signals Qa, θ, SGT, Tw and Do outputted from the various sensors 2, 4, 5, 6 and 7 installed at the peripheral portions of the engine 1, as mentioned above, are supplied as input information signals to the control unit 8 which in turn outputs driving control signals for various devices and actuators such as spark plugs and fuel injectors (described hereinafter) in dependence on the operation states of the engine to thereby perform various sequential controls inclusive of the ignition timing control and fuel injection control for each of the cylinders of the engine 1. Owing to such arrangement as mentioned above, the engine 1 can be driven through combustion of the air-fuel mixture at the desired ignition timing with the desired air-fuel ratio.

A spark plug 9 is mounted within each of the cylinders of the engine 1, being exposed to the combustion chamber defined within the cylinder, wherein the firing of the spark plug 9 is controlled by an ignition timing control signal P outputted from the control unit 8.

As can be seen in FIG. 10, a bypass passage BP is provided in parallel to the intake pipe 1a so that the intake air can controllably bypass the throttle valve 3.

More specifically, operation of the air bypass valve 10 provided at the bypass passage BP is controlled by a bypass control signal B outputted from the control unit 8, whereby the rate of bypass air flow (i.e., bypassed intake air quantity) Qb which bypasses the throttle valve 3 can be regulated by selectively opening or closing the bypass passage BP. In this manner, there can be realized not only the engine torque control in the running state of the motor vehicle but also the engine rotation speed control in the idling operation state of the engine (the engine operation state in which the throttle valve 3 is fully closed).

Referring continuously to FIG. 10, a fuel injector 11 is mounted within the intake manifold located downstream of the intake pipe 1a. Operation of the fuel injector 11 is controlled by the fuel injection control signal J outputted from the control unit 8, whereby controlled quantity of the fuel is supplied to the engine cylinders.

An exhaust gas recirculation pipe (hereinafter also referred to as the EGR pipe) EP through which the exhaust pipe 1b is communicated with the intake pipe 1a serves for recirculating the exhaust gas discharged from the engine 1 into the combustion chamber thereof with a view to reducing harmful components of the exhaust gas such as nitrogen oxides or $NO_x$ by burning again the exhaust gas.

An exhaust gas recirculation valve 12 (hereinafter also referred to as the EGR valve) mounted on the EGR pipe EP is driven by an EGR control signal E issued from the control unit 8 to thereby control the amount or quantity of the exhaust gas (referred to as the EGR quantity in short) recirculated from the exhaust pipe 1b to the intake pipe 1a.

A cylinder identifying sensor 13 mounted on the cam shaft of the engine 1 outputs to the control unit 8 a cylinder identifying signal SGC for identifying the combustion cylinder in synchronism with the operation of the intake valve of the engine 1.

A check valve 15 communicated to the intake manifold of the intake pipe 1a serves to hold a lower limit value of an intake or manifold pressure (negative pressure or vacuum) Pi within the intake pipe 1a as a brake operating pressure PB.

Communicated to the check valve 15 is a master bag 16 which serves for storing the brake operating pressure PB in a predetermined negative pressure state or at a predetermined vacuum level)

The check valve 15 and the master bag 16 cooperate to constitute a brake operating pressure generating means which may also be referred to as the brake pressure multiplication mechanism for generating a negative brake operating pressure PB on the basis of the intake pressure (intake-manifold pressure) Pi of the engine 1. By using the brake operating pressure PB as a driving energy source, a braking mechanism (not shown) is actuated for assisting the operator or driver of the motor vehicle in his or her brake manipulation.

More specifically, when the operator or driver detaches his or her foot from the accelerator pedal, the throttle valve 3 is closed, as a result of which the intake air quantity fed to the cylinders of the engine 1 decreases, whereby the intake pressure Pi is stored as a negative-pressure source for the brake force to be used for actuating the braking mechanism (hereinafter referred to simply as the brake).

As is apparent from the above, the intake pressure Pi of the engine 1 is used as the brake operating pressure PB for actuating the brake, wherein the intake pressure Pi is stored in the master bag 16 by way of the check valve 15 in the engine operation state such as the idling operation, brake applying operation or the like in which the intake pressure Pi becomes negative (e.g. the intake pressure Pi assumes a minimum value PO, as will be described hereinafter).

On the other hand, in the engine operation state such as the ordinary running state in which the intake pressure Pi is high, leakage of the negative pressure from the master bag 16 to the intake pipe is prevented owing to the action of the interposed check valve 15. In this manner, the brake operating pressure PB (negative pressure or vacuum) is prevented from consumption so long as the brake is not applied. Thus, the brake operating pressure PB is ordinarily held at a pressure level or vacuum level which does not exceed the intake pressure Pi.

The detection signals Qa, θ, SGT, Tw, Do and SGC derived from the outputs of the air flow sensor 2, the throttle position sensor 4, the crank angle sensor 5, the water temperature sensor 6, the $O_2$-sensor 7 and the cylinder identifying sensor 13, respectively, are inputted to the control unit 8. On the other hand, the various components or devices such as the spark plug 9, the air bypass valve 10, the fuel injector 11 and the EGR valve 12 are driven in response to control signals P, B, J and E, respectively, which are outputted from the control unit 8.

In the conventional fuel control system for the indirect injection type engine implemented in such arrangement as shown in FIG. 10, when the fuel injection control signal J is outputted from the control unit 8, the fuel injector 11 is driven in response thereto during a period corresponding to the pulse width of the fuel injection control signal J, whereby a quantity of fuel indicated by the fuel injection control signal J is injected into the intake pipe 1a.

However, when the fuel is injected by the injector mounted externally of the engine cylinder, as shown in FIG. 10, a part of the fuel will adhere to inner walls of the intake pipe 1a and surfaces of the intake valves of the engine 1 before the fuel is actually charged into the engine cylinder. In this conjunction, it is noted that such fuel deposition is likely to occur particularly when the engine is operating at a low temperature (such as engine starting operation in which the fuel is relatively difficult to vaporize) or when the engine is in a transient operation state where the amount of fuel to be supplied to the engine has to be changed at a high response speed. Thus, reduction of the contents of harmful gas components carried by the exhaust gas is subjected to adverse influence.

Under the circumstances, there has been proposed a cylinder injection type internal combustion engine system which is designed for injecting the fuel directly into the engine cylinders with a view to solving the problem mentioned above.

Such direct fuel injection engine system (or cylinder injection type engine system) attracts attention as an ideal engine system. When the above-mentioned engine system is adopted in place of the conventional gasoline engines for the motor vehicle, there can be realized very advantageous effects, which will be mentioned below.

(1) Reduction of Harmful Gas Components Contained in the Exhaust Gas

Since the fuel is directly injected into the combustion chamber defined within the engine cylinder in the vicinity of the spark plug 9 (refer to FIG. 10), the air-fuel ratio may be increased so that the air-fuel mixture becomes lean without taking into consideration the delay involved in the transportation of the fuel, whereby contents of harmful HC (hydro carbon) gas and CO (carbon monoxide) gas carried by the exhaust gas can be reduced.

(2) Reduction of Fuel Consumption

Because the fuel is injected immediately before the ignition timing under the control of the ignition timing signal, there is formed a mass of combustible fuel mixture around the spark plug 9 at the time of ignition, rendering nonuniform the distribution of the gas mixture containing the fuel. Thus, the fuel-air mixture undergoes a so-called stratified combustion. By virtue of this feature, the air-fuel ratio in appearance between the amount of air and that of the fuel charged into the engine cylinder can be significantly increased with the air-fuel mixture being made lean correspondingly.

Besides, owing to realization of the stratified combustion mentioned above, combustion of the air-fuel mixture is less affected adversely even when the exhaust gas is recirculated with an increased ratio (i.e., notwithstanding of increased exhaust gas recirculation or EGR in abbreviation). Besides, the intake air quantity Qa can be increased, which in turn means that so-called pumping loss can be reduced. For these reasons, the fuel-cost performance of the engine can be enhanced significantly.

(3) Increased Output Power of the Engine

Since the air-fuel mixture tends to be concentrated around the spark plug 9, the amount of end gas (air-fuel mixture gas in the regions located remotely from the spark plug 9) decreases favorably owing to the effects of the stratified combustion mentioned previously, whereby the anti-knocking performance of the engine can be enhanced with the compression ratio in the engine 1 being significantly increased.

Furthermore, because the fuel is converted into gas or gasified within the cylinder, the intake air is deprived of heat as vaporization heat. Consequently, the density of the intake air can be increased, which is effective for enhancing the volumetric efficiency.

(4) Enhancement of Drivability

By virtue of the system of injecting directly the fuel into the engine cylinder, the time taken for generating the output torque of the engine 1 through the fuel combustion, starting from the fuel injection, can be shortened when compared with the indirect injection type engine system shown in FIG. 10. Thus, the internal combustion engine system of the cylinder injection type can respond to the demand of the driver with high speed.

Parenthetically, in the fuel control system for the cylinder injection type internal combustion engine, there exists two combustion modes, i.e., a so-called lean mode (or lean operation mode) in which a little amount of fuel is supplied during the compression stroke for thereby enhancing the emission performance as well as the fuel-consumption performance of the engine owing to excessively lean or over-lean stratified combustion and a so-called stoichiometric mode (rich operation mode) in which a predetermined or stoichiometric quantity of fuel is supplied to the engine during the suction stroke with a view to increasing the engine output torque by realizing ordinary uniform mixture combustion.

In the compression-stroke fuel injection mode (lean operation mode), the engine is operated with a lean air-fuel mixture when compared with that in the suction-stroke fuel injection mode (stoichiometric or rich mode), it is required to charge into the engine 1 an increased amount of intake air Qa for a given throttle opening degree θ (a given depression stroke of the accelerator pedal). Consequently, the intake air quantity Qa controlled ordinarily only with the accelerator pedal by the driver has to be controlled by resorting to another control means in order to increase the intake air quantity Qa.

Now, description will be made of a conventional cylinder injection type internal combustion engine system. FIG. 11 is a schematic diagram showing generally a structure of a conventional fuel control system for a cylinder injection type internal combustion engine such as disclosed in Japanese Unexamined Patent Application Publication No. 186034/1987 (JP-A-62-186034). In the figure, components like as or equivalent to those described hereinbefore by reference to FIG. 10 are designated by like reference characters and repeated description in detail of these components is omitted.

In the cylinder injection type internal combustion engine now of concern, the fuel control system is so designed as to adjust or regulate supplementarily the fuel injection quantity in response to change or variation of the fuel pressure in order to suppress the change in the engine output torque.

Referring to FIG. 11, the control unit 8A is so designed as to determine arithmetically the fuel supply quantity and the fuel injection timing for outputting the fuel injection control signal J in accordance with the result of the arithmetic operation, to thereby allow a fuel injector 11A to be driven during at least one of the suction stroke and the compression stroke for injecting the fuel. In that case, by identifying the control-subjected cylinder on the basis of the cylinder identifying signal SGC, the fuel injector 11A can be controlled on a cylinder-by-cylinder basis.

The fuel injector 11A is not mounted within the intake pipe 1a but installed within the cylinder so as to be directly exposed to the combustion chamber of the engine 1 and is implemented with high-speed/high-pressure specifications so that the fuel of high pressure can be injected into the cylinder within a short time period during the suction or compression stroke.

A fuel injector driver 14 interposed between the control unit 8A and the fuel injector 11A to drive the fuel injector 11 serves to convert a fuel injection control signal J issued by the control unit 8A to a fuel injection control signal K for the high-speed/high-pressure fuel injection to thereby drive the fuel injector 11A.

Since the injector driver 14 is designed so as to output a fuel injection control signal K of a large electric power by amplifying the power of the fuel injection control signal J issued by the control unit 8A, as mentioned above, the fuel can be injected at a pressure sufficiently high for overcoming the pressure prevailing within the cylinder.

Further, the air bypass valve 10A of the engine system now under consideration is so arranged as to control the bypass intake air quantity Qb over a wide range when compared with the air bypass valve 10 of the engine system described hereinbefore by reference to FIG. 10 in order to control the engine output torque during engine operation in the lean mode (i.e., mode in which the engine operates with combustion of lean air-fuel mixture) inclusive of cruising mode in addition to the control of the engine rotation number in the idling operation mode in which the throttle valve 3 is fully closed.

At this juncture, comparison of the cylinder injection type internal combustion engine system shown in FIG. 11 with the system described hereinbefore by reference to FIG. 10 shows that the former differs structurally from the latter in that the fuel injector 11A for supplying the fuel is not mounted within the intake pipe 1a but installed directly within the cylinder of the engine 1 and is implemented with high-speed/high-pressure specifications so that the fuel can be injected into the cylinder at a high pressure within a short time period during the suction or the compression stroke, and that the injector driver 14 is additionally provided to drive the fuel injector 11A of the high-speed/high-pressure specifications.

In the following, operation of the conventional fuel control system for the internal combustion engine of the cylinder injection type (or direct fuel injection type) shown in FIG. 11 will be elucidated.

It is noted that in the fuel control system for the cylinder injection type engine, the fuel control is performed in a stratified combustion mode (i.e., combustion mode in which excessively lean or over-lean air fuel mixture is burnt) by supplying the fuel to the engine cylinder immediately before the ignition timing (the compression-stroke injection). Accordingly, the air-fuel ratio A/F is so controlled as to be more than 30 inclusive, falling within the over-lean range. It should however be noted that the air-fuel ratio of the mixture actually undergoing combustion is close to the stoichiometric air-fuel ratio A/F of 14.7.

In the case of the conventional indirect injection type internal combustion engine shown in FIG. 10, combustion takes place at the air-fuel ratio A/F of ca. 20 (lean burn) in the suction-stroke injection mode after the intake air and the fuel have been mixed uniformly. Differing from the engine system shown in FIG. 10, in the cylinder injection type internal combustion engine shown in FIG. 11, combustion takes place at the air-fuel ratio A/F of ca. 16 (at which nitrogen oxides ($NO_x$) are produced at high rate). Such being the circumstances, in the cylinder injection type internal combustion engine, a large amount or quantity of exhaust gas is recirculated to the engine with a view to realizing reduction of nitrogen oxides ($NO_x$) contained in the exhaust gas discharged from the engine.

As will now be understood from the foregoing, in the cylinder injection type internal combustion engine shown in FIG. 11, lean combustion in the compression-stroke injection is carried out through combination of the stratified combustion which can be realized by subtle control of the fuel injection timing and the ignition timing and the recirculation of a large amount or quantity of exhaust gas which may lead to degradation of the combustion performance of the engine 1.

On the other hand, in the control mode in which high output torque of the engine is demanded as in the case of acceleration of the motor vehicle, the stoichiometric combustion (i.e., combustion of rich air-fuel mixture) is performed in the suction-stroke injection mode, similarly to the indirect injection type engine shown in FIG. 10, for thereby realizing combustion of uniform mixture.

In general, when the engine operation state is changed over from the over-lean combustion state in the compression-stroke injection mode to the rich combustion state in the suction-stroke injection mode, not only the air-fuel ratio and the EGR quantity but also the fuel injection timing and the ignition timing are supplementarily adjusted or regulated. In that case, the intake air quantity Qa is decreased by controlling correspondingly the air bypass valve 10A in order to prevent the output torque of the engine from fluctuation which may otherwise be brought about upon changeover of the fuel injection mode from the compression-stroke injection mode (lean combustion mode) to the suction-stroke injection mode (rich combustion mode).

For changing over the fuel injection mode from the compression-stroke injection mode (lean mode) to the suction-stroke injection mode (rich mode), a large number of control parameters have to be changed substantially concurrently in order to afford change of the combustion state.

In conjunction with the concurrent changeover of many control parameters, it is however noted that because of nonuniformity in the performance among the components subjected to the control, age changing thereof, variation in the environmental conditions during the running of the motor vehicle and/or difference of the combustion states, there may arise such situation in which the combustion state can not make transition smoothly to the combustion of uniform mixture from the stratified combustion, incurring possibly unstable combustion and hence fluctuation of the rotation speed and eventually vibration of the engine 1 upon changeover of the fuel injection control mode.

On the other hand, when the engine rotation number (rpm) becomes lowered due to external load applied to the engine 1 in the lean mode where the fuel supplied in the compression stroke undergoes over-lean stratified combustion, fluctuation of rotation can be suppressed by decreasing the air-fuel ratio A/F (i.e., enriching the air-fuel mixture), because the output power of the engine 1 bears correlation to the fuel supply quantity.

In the field of the conventional internal combustion engines, it has been proposed to suppress the fluctuation of rotation by adjusting supplementarily the ignition timing. However, in the compression-stroke injection mode, the combustion state will change because the phase relation between the ignition timing and the fuel injection timing changes when the ignition timing is altered. Thus, because of difficulty encountered in the control of the ignition timing, as mentioned above, suppression of the fluctuation of the rotation is attempted by adjusting or controlling the fuel supply.

FIG. 12 is a flow chart for illustrating control mode determining operation of the conventional fuel control system for the cylinder injection type internal combustion engine shown in FIG. 11. Further, FIGS. 13 and 14 are views for illustrating arithmetic operations for determining control parameters, i.e., the air-fuel ratio and the ignition timing by mapping in the control mode, i.e., the lean mode and the rich mode, respectively. Incidentally, in FIGS. 13 and 14, engine rotation number Ne (rpm) is taken along the abscissa with engine output torque Te being taken along the ordinate.

More specifically, FIG. 13 is a view for illustrating arithmetic determination of the parameters in the lean mode, i.e., air-fuel ratio A/F1 and ignition timing Pt1 by mapping for an engine rotation number Ne1 (rpm) and an engine torque Te1 in the lean mode. By contrast, FIG. 14 is a view for illustrating arithmetic determination of the parameters in the stoichiometric mode, i.e., air-fuel ratio A/F2 and ignition timing Pt2 by mapping for an engine rotation number Ne2 (rpm) and an engine torque Te2 in the stoichiometric mode (rich mode).

The processing procedure illustrated in FIG. 12 is executed in synchronism with the crank angle signal SGT (indicating a predetermined angular position of the crank shaft or CA in short), as is obvious to those skilled in the art.

Ordinarily, the control unit 8A fetches as the engine operating state information the various sensor signals such as the throttle opening degree θ, crank angle signal SGT, intake air quantity Qa and the water temperature Tw, to thereby set the control mode (i.e., rich mode or stoichiometric mode) on the basis of the engine operating state and determine the parameters (i.e., air-fuel ratio and ignition timing) for the control mode as set.

Referring to FIG. 12 showing the processing procedure during the ordinary operation of the engine, the control unit 8A first executes the control mode decision processing for deciding whether or not the accelerator pedal is in the released state (also referred to as the off-state or simply as off) in which the accelerator pedal is not depressed (step S1).

When it is decided in the step S1 that the accelerator pedal is in the off-state (i.e., when the decision step S1 results in affirmation or "YES"), it is then decided whether or not the current control mode is a stoichiometric mode set forcibly (step S2). In case the decision step S2 results in negation or "NO", then a decision step S3 is executed to decide whether or not the brake is applied (i.e., the brake pedal is depressed or on).

When it is decided in the step S3 that the brake is applied (i.e., when the decision step S3 results in "YES"), then the stoichiometric mode is activated with a forced stoichiometric mode flag being set (step S4), whereupon the processing proceeds to a control quantity calculation processing step S7.

On the other hand, when it is decided in the step S1 that the accelerator pedal is applied (on-state), i.e., when the decision step S1 results in "NO", the forced stoichiometric mode flag is cleared (step S5), whereon the control mode decision processing (step S6) is executed and then the processing proceeds to the control quantity calculation processing (step S7).

By contrast, when it is decided in the step S2 that the current mode is the stoichiometric mode set forcibly (i.e., when the decision step S2 results in "YES"), then the stoichiometric mode activating processing and the forced stoichiometric mode flag setting processing are executed (step S4) without executing the brake application (on) decision step S3.

Furthermore, when it is decided in the step S3 that the brake is off (i.e., when the decision step S3 results in "NO"), then the control mode decision processing is executed in the step S6.

In the control quantity calculation processing (step S7), decision is first made as to whether or not the current control mode is stoichiometric mode (step S8).

Unless the current mode is decided as the stoichiometric mode (i.e., when the decision step S8 results in "NO"), then the current mode is regarded as the lean mode. Accordingly, the air-fuel ratio A/F1 and the ignition timing Pt1 for the lean mode (compression-stroke injection mode) are arithmetically determined in a step S9, as illustrated in FIG. 13, whereupon the processing exits the procedure shown in FIG. 12.

At this juncture, it should be added that in the step S9, the ignition timing Pt1 and the fuel injection timing for the lean mode are arithmetically determined and additionally the EGR valve 12 installed in the EGR pipe EP is opened to allow an EGR quantity EGR1 to be introduced into the intake pipe 1a from the exhaust pipe 1b while the air bypass valve 10A installed in the bypass passage BP is opened to allow a bypass intake air quantity Qb1 to increase considerably. This is for the purpose of increasing the air-fuel ratio A/F to thereby make lean the air-fuel mixture.

On the other hand, when it is decided in the decision step S8 that the current mode is the stoichiometric mode (i.e., when the decision step S8 results in "YES"), the air-fuel ratio A/F2 and the ignition timing Pt2 for the stoichiometric mode (suction-stroke injection mode) are arithmetically determined in a step S10, as illustrated in FIG. 14, whereupon the processing exits the routine shown in FIG. 12.

Further, it should be added that in the step S10, the ignition timing Pt2 and the fuel injection timing for the stoichiometric mode are arithmetically determined and at the same time an EGR valve 12 installed in the EGR pipe EP is closed to allow the exhaust gas recirculation (EGR) from the exhaust pipe 1b to the intake pipe 1a to be interrupted or cut while the air bypass valve 10A is closed to allow the bypass intake air flow to be interrupted or cut. This is for the purpose of decreasing the air-fuel ratio A/F to thereby make rich the air-fuel mixture.

FIG. 15 is a timing chart for illustrating concretely typical operation of the conventional fuel control system for the cylinder injection type internal combustion engine shown in FIG. 11. In FIG. 15, time t is taken along the abscissa. As can be seen in the figure, it is presumed that the accelerator pedal is actuated (ON) at a time point t1, starting from the initial idling state, and the brake application is repetitively activated (ON) at time points t2, . . . , t5, respectively.

Referring to FIG. 15, the brake operating pressure PB is held at a minimum value PO in the idling state where the throttle valve 3 (refer to FIG. 11) is fully closed. In this state, the intake air quantity supplied to the engine 1 is controlled through the bypass passage.

Immediately after the time point t1 when the accelerator pedal is actuated or depressed, starting from the idling state, the stoichiometric control mode is selected in order to ensure a sufficiently large output torque of the engine 1. In that case, the intake pressure Pi (indicated by a single-dot curve) increases steeply. Nevertheless, the brake operating pressure PB represented by a solid-line curve is maintained at the minimum value PO under the action of the check valve 15.

Further, when the intake pressure Pi increases to a level Pi1 (pressure level in the stoichiometric mode in the brake-released state) to assume an equilibrium state, after the accelerator pedal has been depressed. Then, the control mode is changed over to the lean mode from the stoichiometric mode. In that case, the intake pressure Pi increases further to a level Pi2 (the lean-mode pressure in the brake-released or -off state) to assume the equilibrium state due to increase of the intake air quantity in the lean mode.

Subsequently, when the accelerator pedal is released with the brake being applied at the time point t2, the intake pressure Pi decreases to the level Pi3 (lean-mode pressure in the brake-on state), whereas the brake operating pressure PB increases (i.e., vacuum level of the brake operating pressure decreases, to say in another way) due to consumption of the brake operating pressure PB.

More specifically, every time the brake is applied at the time points t2, t3 and t4, respectively, the vacuum level of the brake operating pressure PB rises from the minimum value PO to the values PB3, PB4 and then to the value PB5 progressively in this order. At a time point t5 immediately after the time point t4 at which the brake operating pressure PB exceeds the upper limit value (threshold value) PTH which delimits the range enabling the brake operating pressure PB to be active, the brake operating pressure PB becomes equal to the intake pressure Pi3, rendering unavailable the assist efforts for the brake application.

By the way, in the compression-stroke injection mode, the engine operates with lean air-fuel mixture when compared with the engine operation in the suction-stroke injection mode. Accordingly, in the compression-stroke injection mode, it is required to increase the intake air quantity fed to the engine 1 even when the operator actuates the throttle valve to a same opening degree as in the suction-stroke injection mode by actuating the accelerator pedal, as a result of which the intake pressure (intake manifold pressure) Pi becomes high in the compression-stroke injection mode.

In the state where the intake pressure is high, as mentioned above, intake air loss (pumping loss) of the engine 1 is low with the load torque imposed on the engine 1 being decreased, which is favorable from the standpoint of the fuel-cost performance of the engine.

In this conjunction, it is noted that in the cylinder injection type engine, the engine can operate in the over-lean operation state, as mentioned previously. Accordingly, even when the operator detaches his or her foot from the accelerator pedal for the brake operation, engine operation in the lean operation state can be continued without reducing the intake air quantity, as a result of which the fuel-consumption performance of the engine can be improved.

It is however noted in conjunction with the engine operation in the lean mode that such situation is likely to occur in which sufficiently high brake operating pressure PB (brake power source of negative pressure or vacuum) is not available. In particular, in case the brake operating pressure PB stored in the master bag 16 has been consumed due to the so-called pumping brake operation, there may be incurred degradation in the brake performance.

The problem mentioned above may naturally take place even in a Diesel engine which includes no throttle valve and in which the intake pressure of negative level can not exist inherently. However, in the case of the Diesel engine, the above problem is solved by employing a vacuum pump.

By contrast, in the case of the cylinder injection type engine, the intake air quantity is controlled for the over-lean stratified combustion by supplying the fuel in the compression stroke (lean operation mode), as described hereinbefore. Consequently, difficulty is encountered in ensuring the intake pressure Pi of a vacuum level during the engine operation in the lean mode.

Certainly, it is conceivable that when the intake pressure of a vacuum level is required for the brake control, the intake air quantity is decreased by supplying the fuel during the suction stroke to thereby allow the ordinary uniform mixture combustion (stoichiometric combustion) to take place with a view to ensuring the intake pressure of a vacuum level.

FIG. 16 is a timing chart for illustrating operations involved in changing over the control mode from the lean mode to the stoichiometric mode every time the brake is applied at the time points t2, t3, t4 and t5, respectively.

As can be seen in FIG. 16, the brake operating pressure PB converges to the pressure PS of a vacuum level in the stoichiometric mode which is slightly higher than the minimum level PO in the idling mode. Further, the level of the pressure PS in the stoichiometric mode becomes lower as the rotation speed (rpm) of the engine 1 increases.

Referring to FIG. 16, the control mode of the engine 1 is changed over to the stoichiometric mode from the lean mode at the time points t2, t3, t4 and t5, respectively.

In that case, the bypass intake air flow Qb is cut in the stoichiometric mode (see step S10 shown in FIG. 12), which results in that the intake air quantity Qa fed to the engine 1 decreases. Thus, the negative pressure or vacuum for the brake operating pressure PB can be ensured.

Consequently, the intake pressure Pi is held at a level not higher than the intake pressure Pi2, as indicated by a single-dot broken curve shown in FIG. 16, while the brake operating pressure PB (indicated by a solid line curve) is held at a level not higher than the upper limit value PB11. Thus, the brake effort assisting capability can be protected against degradation.

However, assurance of the negative pressure or vacuum by changing over the operation mode from the compression-stroke injection (lean operation state) to the suction-stroke injection (stoichiometric operation state) and repetition of the compression-stroke injection (lean operation) and the suction-stroke injection (stoichiometric operation) are unfavorable from the standpoint of the combustion performance, involving ultimately deterioration of the drivability of the motor vehicle.

As will now be understood from the foregoing description, the conventional fuel control system for the cylinder injection type internal combustion engine suffers a problem that the brake operating pressure PB increases in the lean mode, incurring degradation in the brake performance because no consideration is paid to the assurance of the brake operating pressure PB (negative pressure or vacuum).

Furthermore, when the engine operation mode is changed over to the ordinary stoichiometric mode (operation with rich air-fuel mixture) in the course of the lean operation (i.e., operation with lean air-fuel mixture) with the aim of ensuring the brake operating pressure PB, then the compression-stroke injection and the suction-stroke injection are alternately repeated at a high frequency, degrading the combustibility or combustion performance, which in turn leads to degradation of the drivability, giving rise to another problem.

SUMMARY OF THE INVENTION

In the light of the state of the art described above, it is an object of the present invention to provide a fuel control system for the cylinder injection type internal combustion engine, which system is capable of ensuring improved brake performance while protecting the combustibility or combustion performance of the engine against degradation notwithstanding of the fact that such cylinder injection type engine requires complicate and subtle controls in order to suppress variation or fluctuation of the engine output torque.

In view of the above and other objects which will become apparent as the description proceeds, there is provided according to a first aspect of the present invention a fuel control system for a cylinder injection type internal combustion engine, which system includes various sensors for outputting information signals indicative of operating states of the internal combustion engine, fuel injectors for injecting fuel directly into cylinders, respectively, of the internal combustion engine, an intake means for determining intake air quantity to be supplied to the internal combustion engine, a control unit for determining arithmetically fuel supply quantity and intake air quantity to be fed to each of the cylinders on the basis of the engine operating states while controlling the fuel injectors in a compression-stroke fuel injection mode or alternatively in a suction-stroke fuel injection mode on the basis of the fuel supply quantity, a brake operating pressure generating means for generating a brake operating pressure of a vacuum level on the basis of an intake pressure of the engine, and a braking mechanism actuated upon application of the brake operating pressure serving as a braking power source. The various sensors are comprised of an intake air flow sensor for detecting the intake air flow fed to the internal combustion engine for thereby outputting a corresponding information signal, a crank angle sensor for detecting rotation speed (rpm) of the engine and a crank angle thereof to thereby output a corresponding information signal, and a pressure sensor for detecting the brake operating pressure. The control unit which may be implemented by employing a microprocessor or microcomputer is so designed or programmed as to compare the vacuum level of the brake operating pressure with a predetermined level corresponding to a permissible upper limit value of the vacuum level, to thereby control the engine in a mode conforming to the engine operating state when the vacuum level of the brake operating pressure is lower than the predetermined level, whereas when the vacuum level of the brake operating pressure is equal to or higher than the predetermined level, the control unit controls the engine in a stoichiometric mode by decreasing the intake air quantity fed to the engine while increasing the fuel supply quantity for enriching a resultant air-fuel mixture, to thereby allow the vacuum level of the brake operating pressure to be held lower than the predetermined level.

By virtue of the feature mentioned above, frequent changeover of the control mode can be avoided and a sufficient vacuum level can be ensured for the brake operating pressure without incurring degradation of the combustibility and fuel-consumption performance of the engine. In this conjunction, additional provision of any special circuit or device is not required.

In a preferred mode for carrying out the invention, the control unit may be so designed or programmed that when the vacuum level of the brake operating pressure which has become equal to or higher than the predetermined level regains a level lower than the predetermined level owing to activation of the suction-stroke injection mode, the control unit changes over the control mode for the internal combustion engine from the suction-stroke injection mode to the compression-stroke injection mode in response to deactivation of the braking mechanism.

By virtue of the feature mentioned above, it is possible to suppress the frequent changeover of the control mode and ensure a sufficient vacuum level for the brake operating pressure, while protecting the combustibility from the degradation.

According to another aspect of the present invention, there is provided a fuel control system for a cylinder injection type internal combustion engine, which system includes various sensors for outputting information signals indicative of operating states of the internal combustion engine, fuel.injectors for injecting fuel directly into cylinders, respectively, of the internal combustion engine, spark plugs provided in association with the cylinders, respectively, of the internal combustion engine, an intake means for determining intake air quantity to be supplied to the internal combustion engine, an exhaust gas recirculation valve for adjusting a quantity of exhaust gas recirculated from an exhaust pipe to the intake means of the engine, a control unit for determining arithmetically control timings for the fuel injectors and the spark plugs as well as the intake air quantity and the exhaust gas recirculation quantity on the basis of the engine operating states while controlling the fuel injector in a compression-stroke fuel injection mode or alternatively in a suction-stroke fuel injection mode in dependence on the fuel supply quantity, a brake operating pressure generating means for generating a brake operating pressure of a vacuum level on the basis of an intake pressure of the engine, and a braking mechanism actuated upon application of the brake operating pressure serving as a braking energy source. The various sensors are comprised of an intake air flow sensor for detecting the intake air flow fed to the engine for thereby outputting a corresponding information signal, a crank angle sensor for detecting rotation speed of the engine and a crank angle thereof to thereby output a corresponding information signal, and a pressure sensor for detecting the brake operating pressure. The control unit which may be implemented by employing a microprocessor or microcomputer is so designed or programmed as to control the engine in a control mode in dependence on the engine operating state so long as the braking mechanism is not activated, whereas when the braking mechanism is applied and when the control mode of the internal combustion engine is the compression-stroke injection mode, the control unit controls the internal combustion engine in a supplementary lean mode by decreasing at least one of the intake air quantity and the exhaust gas recirculation quantity of the engine to thereby decrease air-fuel ratio and at the same time by retarding supplementarily operation timings for the spark plugs and the fuel injectors in conformance with the air-fuel ratio.

With the arrangement described above, the combustibility and the fuel-consumption performance of the engine can be protected against degradation and a sufficient vacuum level can be ensured for the brake operating pressure without providing additionally any special circuit or device.

In another preferred mode for carrying out the invention, the control unit may be so designed or programmed as to control the internal combustion engine in a suction-stroke fuel injection mode during the supplementary lean mode.

Owing to the arrangement mentioned above, a sufficient vacuum level can be ensured more positively for the brake operating pressure.

In yet another preferred mode for carrying out the invention, the control unit may be so designed or programmed that when the braking mechanism is being actuated and when the vacuum level of the brake operating pressure becomes equal to or higher than a predetermined level corresponding to a permissible upper limit value of the vacuum level, the control unit controls the internal combustion engine in a stoichiometric mode by increasing the fuel supply quantity for thereby enriching air-fuel mixture.

With the arrangement mentioned above, the combustibility and fuel-consumption performance of the engine can be protected against degradation, because frequent changeovers of the control mode can be suppressed, whereby a sufficient vacuum level can be ensured for the brake operating pressure without fail.

In still another preferred mode for carrying out the invention, the control unit may be so designed or programmed software wise that when the vacuum level of the brake operating pressure becomes equal to or higher than a predetermined level corresponding to a permissible upper limit value of the vacuum level in the supplementary lean mode, the exhaust gas recirculation quantity is decreased supplementarily.

By virtue of the above arrangement, the combustibility and the fuel-consumption performance of the internal combustion engine can be protected against degradation while a sufficient vacuum level can be ensured for the brake operating pressure.

In a further preferred mode for carrying out the invention, the control unit may be so designed or programmed software wise that when the vacuum level of the brake operating pressure remains equal to or higher than the predetermined level continuously for a time period longer than a predetermined time in the supplementary lean mode, the internal combustion engine in the stoichiometric mode is controlled by increasing the fuel supply quantity.

By virtue of the above arrangement, the combustibility and the fuel-consumption performance of the engine can be protected against degradation and at the same time a sufficient vacuum level can be ensured for the brake operating pressure.

According to a further aspect of the present invention, there is provided a fuel control system for a cylinder injection type internal combustion engine, which system includes various sensors for outputting information signals indicative of operating states of the internal combustion engine, fuel injectors for injecting fuel directly into cylinders, respectively, of the internal combustion engine, spark plugs provided in association with the cylinders, respectively, of the internal combustion engine, an intake means for determining intake air quantity to be supplied to the internal combustion engine, an exhaust gas recirculation valve for adjusting a quantity of exhaust gas recirculated from an exhaust pipe to the intake pipe of the internal combustion engine, a control unit for determining arithmetically control timings for the fuel injector and the spark plug as well as the intake air quantity and the exhaust gas recirculation quantity on the basis of the engine operating states while controlling the fuel injector in a compression-stroke fuel injection mode or alternatively in a suction-stroke fuel injection mode in dependence on the fuel supply quantity, a brake operating pressure generating means for generating a brake operating pressure of a vacuum level on the basis of an intake pressure of the engine, and a braking mechanism actuated upon application of the brake operating pressure serving as a braking energy source. The various sensors are comprised of an intake air flow sensor for detecting the intake air flow fed to the internal combustion engine for thereby outputting a corresponding information signal, a crank angle sensor for detecting rotation speed (rpm) of the engine and a crank angle thereof to thereby output a corresponding information signal, and a pressure sensor for detecting the brake operating pressure. The control unit which may be implemented by employing a microprocessor or microcomputer is so designed or programmed as to compare the vacuum level of the brake operating pressure with a first predetermined level corresponding to a permissible upper limit value of the vacuum level to thereby control the engine in a mode conforming to the engine operating state when the vacuum level of the brake operating pressure is lower than the first predetermined level, whereas when the vacuum level of the brake operating pressure becomes equal to or higher than the first predetermined level, the control unit controls the engine in a supplementary lean mode by decreasing at least one of the intake air quantity fed to the engine and the exhaust gas recirculation quantity to thereby decrease the air-fuel ratio for enriching a resultant air-fuel mixture and at the same time by retarding supplementarily operation timings for the spark plug and the fuel injector in conformance with the air-fuel ratio.

By virtue of the arrangement described above, the combustibility and the fuel-consumption performance of the internal combustion engine can be protected against degradation and at the same time a sufficient vacuum level can be ensured for the brake operating pressure without need for providing additionally any special circuit or device.

In a yet further preferred mode for carrying out the invention, the control unit may be so designed or programmed as to control the internal combustion engine in a suction-stroke fuel injection mode during the supplementary lean mode.

Owing to the arrangement mentioned above, a sufficient vacuum level can be ensured for the brake operating pressure more positively.

In a still further preferred mode for carrying out the invention, the control unit may be so designed or programmed that when the vacuum level of the brake operating pressure is equal to or higher than the first predetermined level, then the vacuum level of the brake operating pressure is compared with a second predetermined level which is higher than the first predetermined level and that when the vacuum level of the brake operating pressure becomes equal to or exceeds the second predetermined level, the fuel supply quantity is increased for controlling the engine in the stoichiometric mode.

With the above arrangement, degradation of the combustibility and fuel-consumption performance of the engine can be suppressed, whereby obtain a sufficient vacuum level for the brake operating pressure can be obtained.

In a further preferred mode for carrying out the invention, the control unit may be so designed or programmed that the vacuum level of the brake operating pressure remains equal to or higher than the predetermined level continuously for a time period longer than a predetermined time in the supplementary lean mode, then the internal combustion engine is controlled in the stoichiometric mode with the fuel supply quantity being increased.

With the arrangement described above, degradation of the combustibility and fuel-consumption performance of the engine can be suppressed and at the same time a sufficient vacuum level for the brake operating pressure can be ensured more specifically.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 1 to 3 are views for illustrating a first embodiment of the present invention, wherein FIG. 1 is a schematic diagram showing generally a structure of a fuel control system for a cylinder injection type engine according to a first embodiment of the present invention;

FIG. 2 is a flow chart for illustrating an engine control mode determination procedure performed by a control unit incorporated in the fuel control system according to the first embodiment of the invention;

FIG. 3 is a timing chart for illustrating in concrete control operations of the fuel control system according to the first embodiment of the invention;

FIGS. 4 to 7 are views for illustrating a second embodiment of the present invention, wherein FIG. 4 is a flow chart for illustrating control mode determination procedure carried out by a control unit incorporated in the fuel control system according to the second embodiment of the invention;

FIG. 5 is a view for illustrating, by way of example only, arithmetic operations for determining control parameters in a lean mode by two-dimensional mapping;

FIG. 6 is a view for illustrating, by way of example only, arithmetic operations for determining control parameters in a supplementary lean mode by two-dimensional mapping;

FIG. 7 is a timing chart for illustrating in concrete control operations of the fuel control system according to the second embodiment of the invention;

DESCRIPTION OF THE PREFERRED EMBODIMENTS

Figure 1:
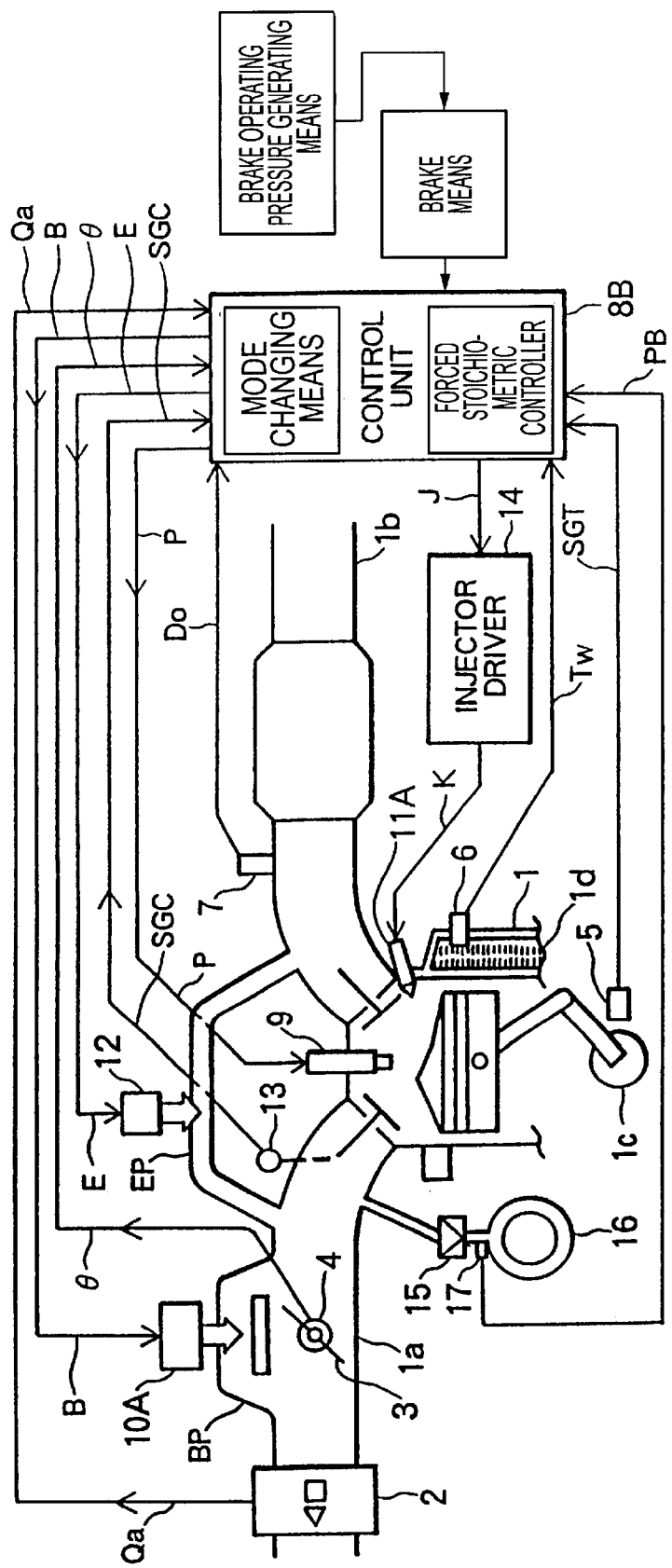

The present invention will be described in detail in conjunction with what is presently considered as preferred or typical embodiments thereof by reference to the drawings. In the following description, like reference characters designate like or corresponding parts throughout the several views.

Embodiment 1

In the following, a fuel control system for a cylinder injection type internal combustion engine according to the first embodiment will be described by reference to the drawings.

Figure 10:
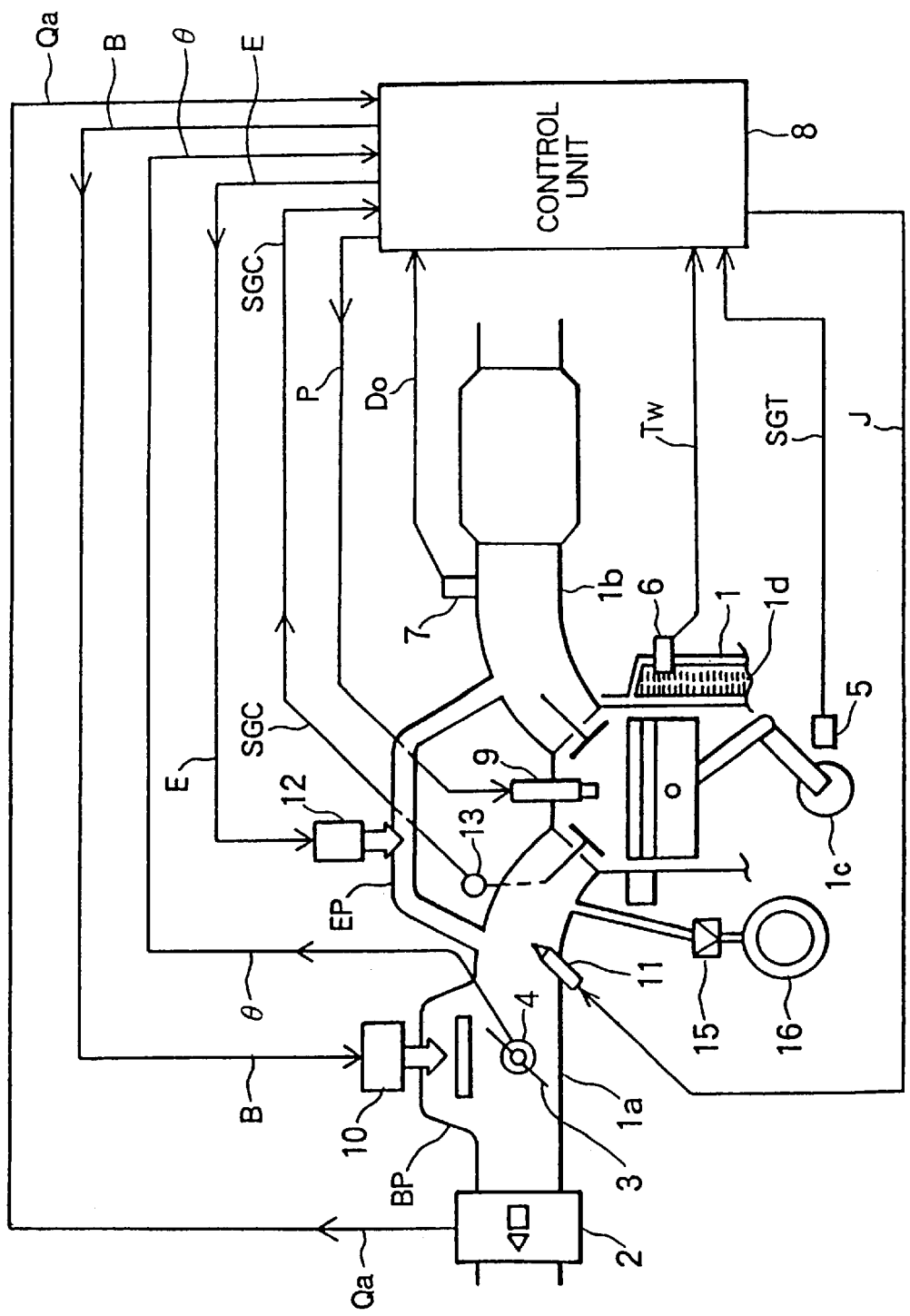
FIG. 10 is a schematic diagram showing a conventional fuel control system for an indirect fuel injection type internal combustion engine.
Figure 11:
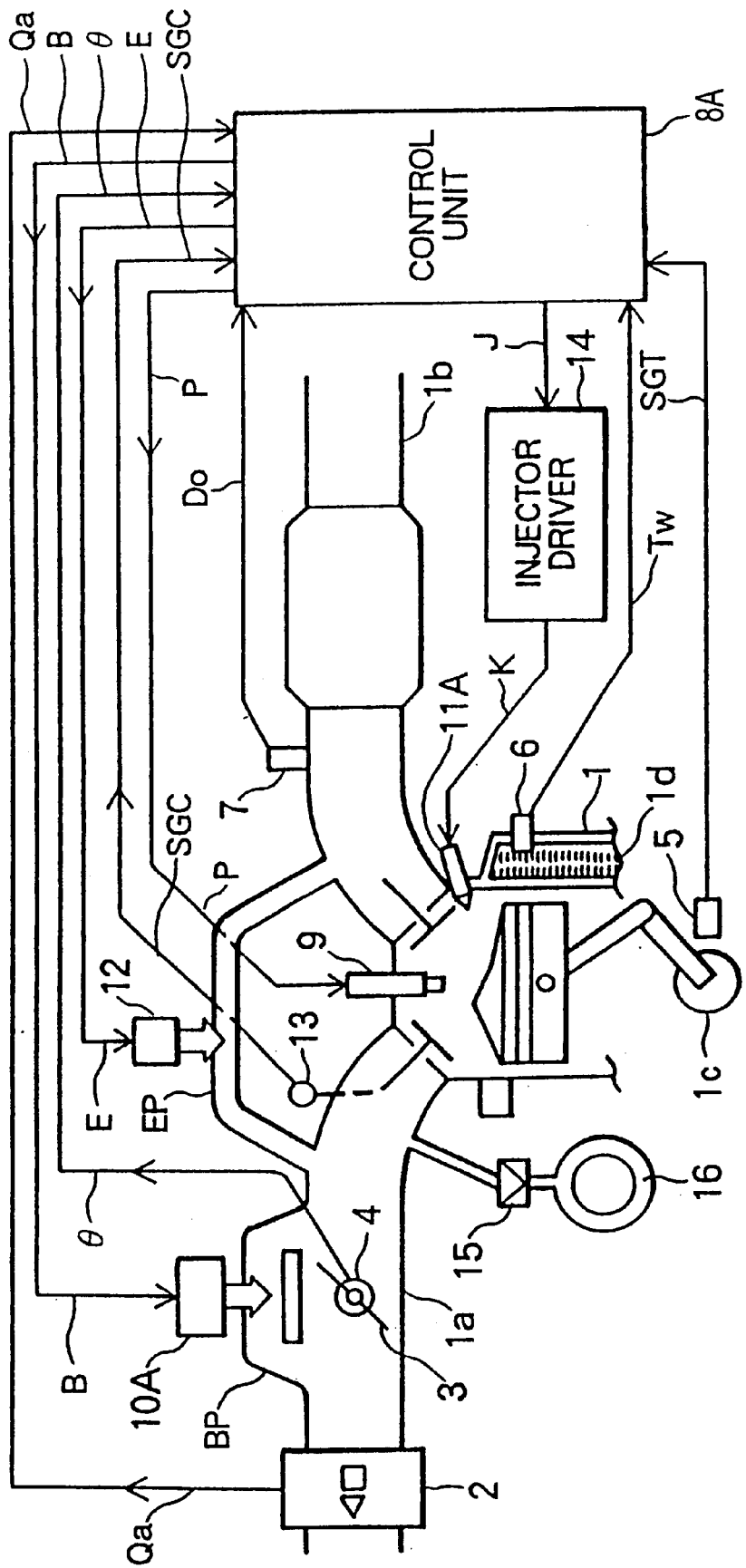
FIG. 11 is a schematic diagram showing generally a structure of a conventional cylinder injection type internal combustion engine together with a fuel control system therefor.

FIG. 1 is a schematic diagram showing generally a structure of a cylinder injection type engine equipped with a fuel control system according to the first embodiment of the invention. In FIG. 1, components same as or equivalent to those mentioned hereinbefore in conjunction with the conventional engine system are denoted by like reference characters as those used in FIGS. 10 and 11 and repeated description thereof is omitted. Parenthetically, a control unit 8B shown in FIG. 1 corresponds to the control unit 8A mentioned previously.

As can be seen in FIG. 1, in addition to the air flow sensor 2 and the crank angle sensor 5 mentioned hereinbefore, a pressure sensor 17 for detecting a brake operating pressure PB, a brake switch (not shown) and others which will be described later on are provided as various sensors in association with the control unit 8B.

The pressure sensor 17 is installed in association with the brake operating pressure multiplication mechanism constituted by the check valve 15 and the master bag 16 and designed to detect a brake operating pressure PB of the negative (minus) or vacuum level for actuating the brake, to thereby issue an output signal which is supplied to the control unit 8B.

On the other hand, the control unit 8B which may be constituted by a microprocessor/microcomputer is designed or programmed such that when the brake operating pressure PB becomes equal to or higher than a predetermined value PTH1 corresponding to a permissible upper limit value, the intake air quantity Qa fed to the engine 1 is decreased while the fuel supply quantity fed to the engine is increased for thereby enriching the air-fuel mixture. In other words, the engine 1 is controlled in the stoichiometric mode in order to allow the brake operating pressure PB to be held at a negative or vacuum level lower than the level given by the predetermined value PTH1. Hereinafter, the level given by the predetermined value will also be referred to as the predetermined level.

Figure 2:
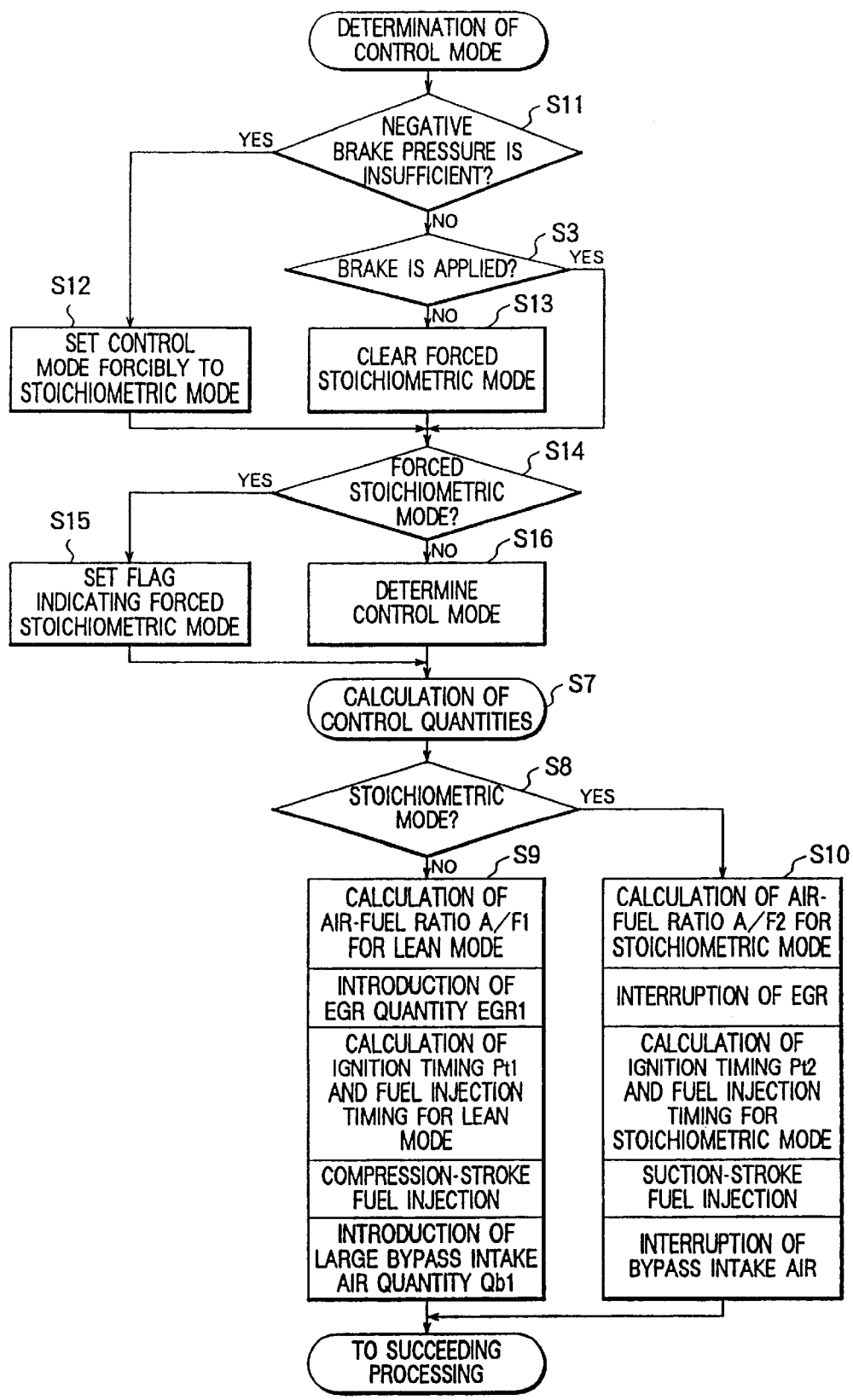

Next, by reference to a flow chart of FIG. 2, description will be directed to the control mode determining operation performed by the control unit incorporated in the fuel control system according to the first embodiment of the invention shown in FIG. 1.

Figure 12:
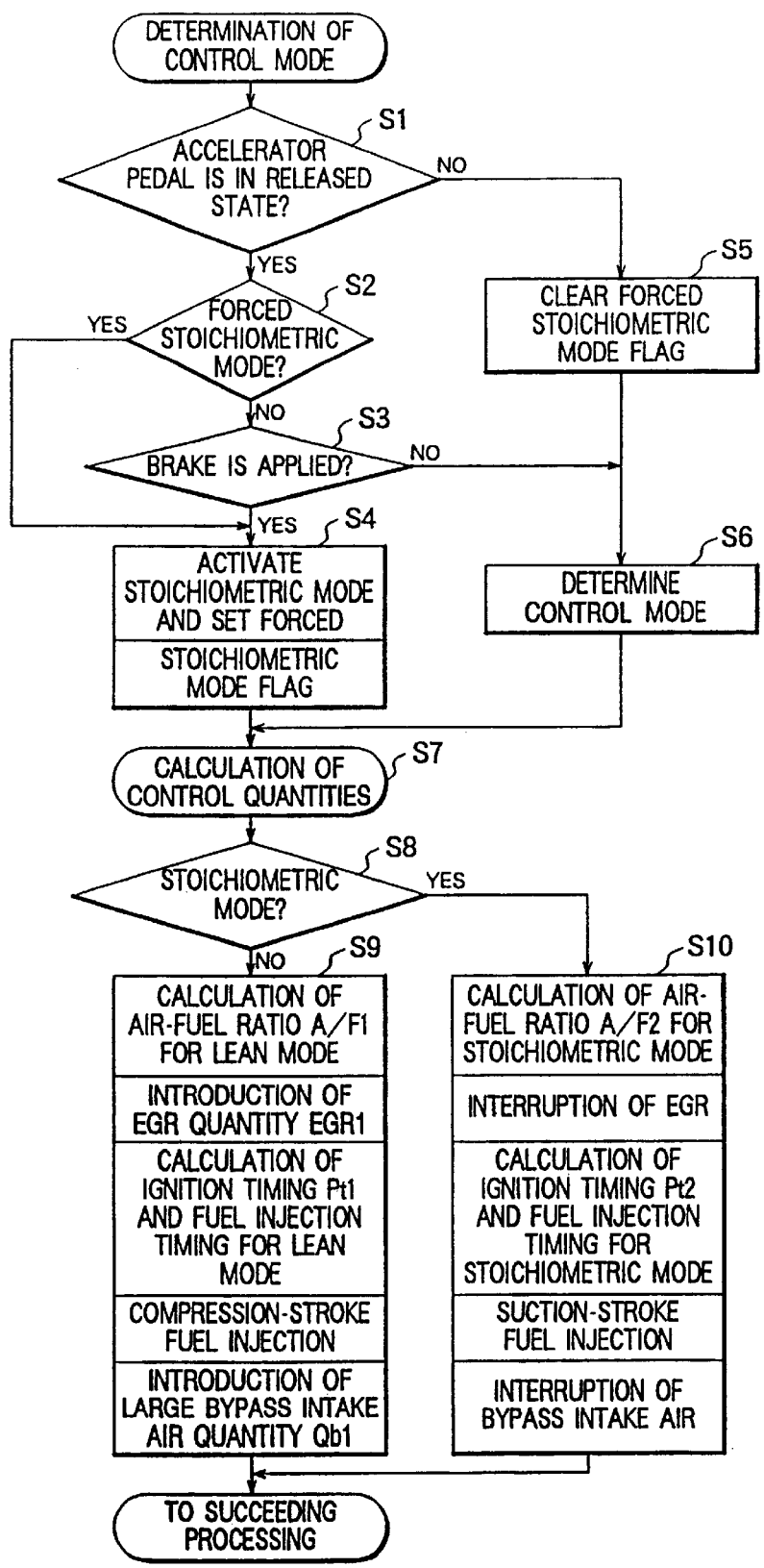
FIG. 12 is a flow chart for illustrating control procedures executed by a control unit incorporated in the conventional fuel control system for the engine shown in FIG. 11.

In FIG. 2, processing steps S3, S7, S8, S9 and S10 are similar to those mentioned hereinbefore (see FIG. 12).

Ordinarily, the control unit 8B controls the engine 1 in the stoichiometric mode (suction-stroke injection mode) when a demanded torque is high (e.g. for accelerating operation or the like as mentioned previously) while controlling the engine 1 in the lean mode (the compression-stroke injection mode) when the demanded torque is low (e.g. for light load operation).

Now turning to FIG. 2, the control unit 8B first fetches the signal indicating the brake operating pressure PB derived from the output of the pressure sensor 17, whereon it is decided in a step S11 whether or not the negative or vacuum level of the brake operating pressure is insufficient by checking whether or not the brake operating pressure PB is higher than the level given by a predetermined value (i.e., the permissible upper limit value) PTH1 inclusive.

When it is found in the step S11 that the brake operating pressure PB is insufficient because the brake operating pressure PB is not lower than the permissible upper limit value or level PTH1 (i.e., when the decision step S1 results in affirmation or "YES"), the control mode is then set forcibly to the stoichiometric mode in order to ensure the negative brake operating pressure (step S12), whereon the processing proceeds to a decision step S14. In the following, the stoichiometric mode set forcibly will also be referred to as the forced stoichiometric mode for discrimination from the stoichiometric mode which follows the idling mode.

On the other hand, when it is found in the step S11 that the vacuum level of the brake operating pressure PB is sufficient because the brake operating pressure PB is more negative than the permissible upper limit value PTH1 (i.e., when the decision step S11 results in negation or "NO"), it is then decided in succession whether the brake is applied (step S3).

When decision is made in the step S3 that the brake is not applied (i.e., when the decision step S3 results in "NO"), then the forced stoichiometric mode is cleared or reset (step S13), and the processing proceeds to a decision step S14. By contrast, when it is decided in the step S3 that the brake is applied (i.e., "YES"), the processing goes straightforwardly to the step S14.

In the step S14, decision is made as to whether or not the current control mode is the forced stoichiometric mode. In case the decision step S14 results in affirmation or "YES", a flag indicating the stoichiometric mode is set in a step S15, whereupon the processing proceeds to a control quantity calculation processing step S7.

On the other hand, in case the decision step S14 results in negation or "NO", indicating that the current mode is not the forced stoichiometric mode, then the current control mode is determined in a step S16, whereon the processing proceeds to the step S7.

Subsequently, the processing steps S8, S9 and S10 are executed similarly to those described hereinbefore, whereupon the processing exits the routine shown in FIG. 2.

More specifically, when it is decided that the current control mode is not the forced stoichiometric mode in the step S8, processings for arithmetically determining the parameters for the lean mode are executed in dependence on the engine operating state (step S9). If otherwise, processings for arithmetically determining the parameters for the stoichiometric mode are executed independent of the engine operating state (step S10). These processings are known to those skilled in the art.

Figure 3:
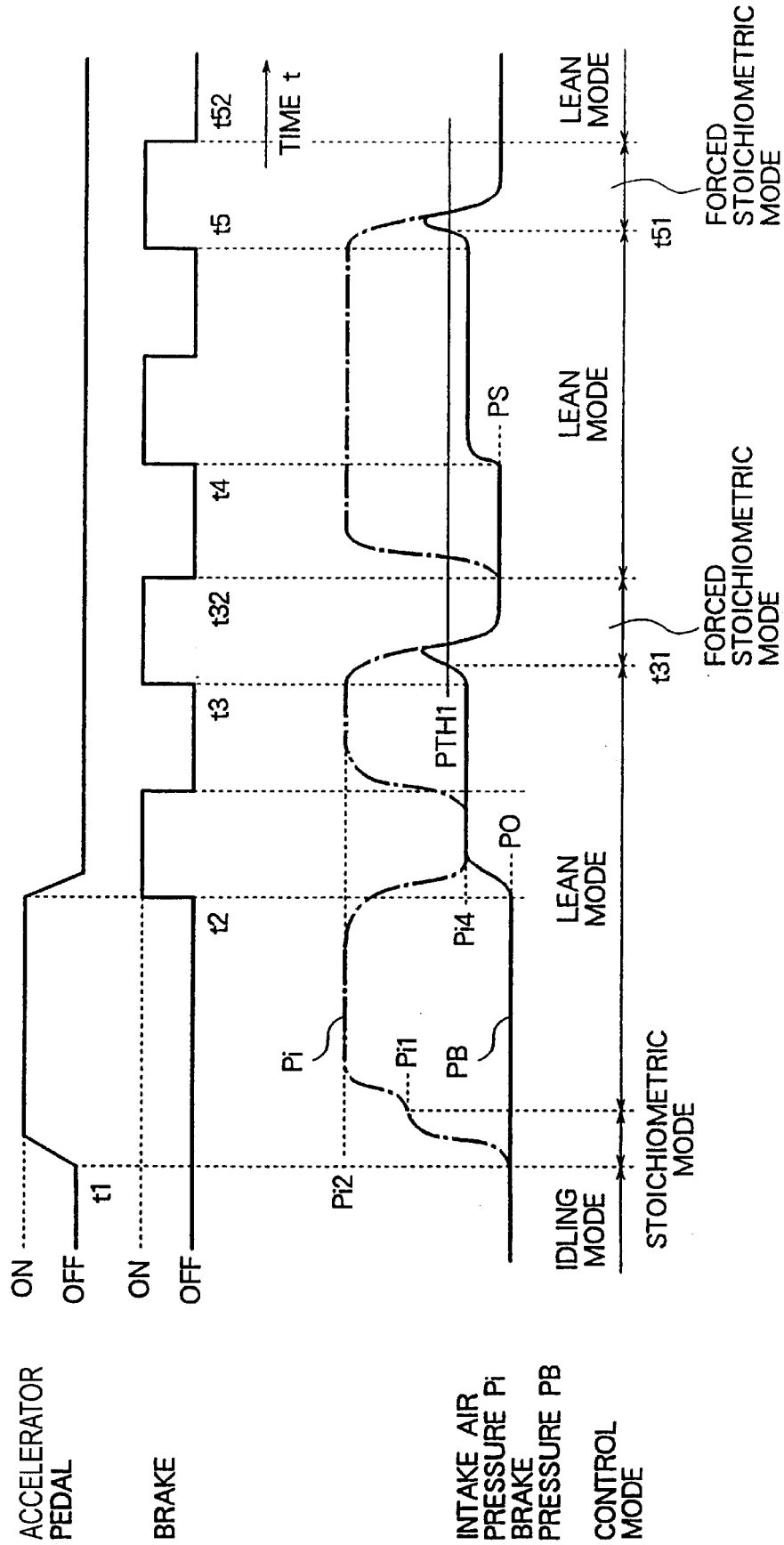

Next, concrete operation of the fuel control system according to the first embodiment of the invention shown in FIG. 1 will be elucidated by reference to a timing chart shown in FIG. 3.

FIG. 3 shows sequential operations corresponding to the processing routine shown in FIG. 2 and illustrates control modes related to the on/off operations of the accelerator pedal and the brake as well as changes in the intake pressure Pi and the brake operating pressure PB as a function of time.

Referring to FIG. 3, it is presumed that the accelerator pedal is actuated at a time point t1. Then, the control mode of the engine 1 is changed over from the idling mode to the stoichiometric mode (suction-stroke injection mode) and then to the lean mode (compression-stroke injection mode).

Subsequently, every time the brake is applied (see time points t2 to t5), the brake operating pressure PB increases toward the atmospheric pressure level due to consumption thereof. In that case, when it is decided that vacuum level of the brake operating pressure PB is insufficient (i.e., $PB \geq PTH1$), then the control mode of the engine 1 is forcibly changed over from the lean mode to the stoichiometric mode which is defined only for convenience of description as the forced stoichiometric mode for discrimination from the stoichiometric mode following the idling mode.

By way of example, at the time point t2 when the brake is first applied, the brake operating pressure PB is sustained at a considerably lower level than the predetermined level PTH1 during the period in which the brake is applied, because the brake operating pressure PB is held at a sufficiently low level (lean pressure level) at that time point. Thus, the lean mode is maintained consecutively as the current control mode without being changed over.

In that case, the intake pressure Pi is lowered to a level Pi4 of the negative pressure or vacuum (lean-mode pressure in the brake-on state) which is lower than a level Pi2 (lean-mode pressure in the brake-off state) due to the brake-on operation (brake applying operation), whereon the brake operating pressure PB coincides with the lean-mode pressure Pi4 to assume an equilibrium state.

Subsequently, when the brake is released (off), the brake operating pressure PB is sustained at the level Pi4 with the intake pressure Pi rising again to the lean level Pi2 (level in the lean mode).

On the other hand, when the brake operating pressure PB increases upon succeeding brake application at the time point t3, and when it is decided that the brake operating pressure PB is not lower than the predetermined level PTH1 corresponding to the permissible upper limit level at the time point t31 immediately after the time point t3, then the control mode is changed over from the lean mode to the forced stoichiometric mode.

As a consequence, the intake pressure Pi lowers to the stoichiometric-mode pressure PS prevailing when the brake is applied. Thus, the brake operating pressure PB also lowers to the stoichiometric-mode pressure PS which is lower than the predetermined level PTH1 in following the intake pressure Pi. Thus, the negative pressure or vacuum state which can sufficiently satisfy the condition that PB <PTH1 is established.

At the time point when the condition that PB <PTH1 is satisfied, the control mode may be restored to the lean mode from the forced stoichiometric mode. However, because the frequent changeover of the control mode incurs degradation of the combustibility or combustion performance of the engine, as pointed out hereinbefore, the control mode is restored to the lean mode at a time point t32 when the brake is released (off).

In succession, the brake is again applied at the time point t4. In that case, the brake operating pressure PB remains lower than the predetermined level PTH1. Consequently, the lean mode is sustained as the control mode.

Further, upon application of the brake at the time point t5, the control mode is changed over from the lean mode to the forced stoichiometric mode at the time point t5 at which the brake operating pressure PB has reached the predetermined level PTH1. The control mode is restored to the lean mode at the time point t52 when the brake is released.

In this way, even when the negative pressure for the brake actuation is consumed by the brake application in the lean mode in which the intake air quantity Qa is large with the vacuum level of the intake pressure Pi being low, the stoichiometric mode is not set up immediately in response to the brake application but at a time point at which the negative pressure for the brake actuation becomes insufficient explicitly.

As will be appreciated from the foregoing description, by virtue of the arrangement of the fuel control system according to the first embodiment of the invention, it is possible to reduce the frequency of changing over the control mode between the lean mode and the stoichiometric mode while ensuring constantly the brake operating pressure PB (brake performance) without incurring degradation in the combustibility and the fuel-consumption performance of the engine.

It should further be noted that the fuel control system according to the invention can be implemented without increasing the manufacturing cost when compared with the conventional system because any especial circuits or devices need not be additionally provided except for the pressure sensor 17.

Embodiment 2

In the case of the fuel control system for the cylinder injection type internal combustion engine according to the first embodiment of the invention, the control mode is forcibly changed over or set to the stoichiometric mode immediately when the brake operating pressure PB reaches or exceeds the predetermined level PTH1 (i.e., when the brake operating pressure PB becomes insufficient). However, frequent repetition of the changeover between the lean mode and the stoichiometric mode gives rise to degradation of the combustibility or combustion performance of the engine, as mentioned previously. Accordingly, the changeover control for validating the forced stoichiometric mode should preferably be avoided as far as possible.

Accordingly, when the brake operating pressure (negative pressure) becomes insufficient due to the brake applying operation in the lean mode, it is preferred to continue this mode consecutively as a supplementary lean mode in which the EGR quantity and the intake air quantity Qa are decreased with the air-fuel ratio A/F3 being decreased (i.e., the air-fuel mixture being enriched) and in which the ignition timing Pt and the fuel injection timing are supplementarily so controlled as to be retarded in dependence on the air-fuel ratio A/F3. The EGR quantity and the intake air quantity Qa can be adjusted on the basis of the control quantities for the EGR valve 12 and the air bypass valve 10A, respectively.

In the following, description will turn to the fuel control system according to the second embodiment of the invention, in which the negative pressure or vacuum can be ensured without need for changing over the control mode but maintaining the lean mode as the above-mentioned supplementary lean mode upon brake application (i.e., upon occurrence of shortage of vacuum).

In this conjuncture, it should first be mentioned that the structure in general of the fuel control system shown in FIG. 1 need not be changed but it is sufficient to partially modify only the operation program incorporated in the control unit 8B.

More specifically, the control unit 8B controls the engine 1 in the ordinary mode in dependence on the engine operating state in the brake-released state (where the negative pressure or vacuum is sufficient) while decreasing the EGR quantity and the intake air quantity Qa in the brake-applied state (where the negative pressure is insufficient) during the lean-mode control in order to ensure the negative brake operating pressure PB. Furthermore, the shortage of the output torque brought about by decrease of the intake air quantity is corrected or compensated for by decreasing the air-fuel ratio A/F (i.e., by enriching the air-fuel mixture). Additionally, the control parameters such as the ignition timings Pt and the fuel injection timings are supplementarily adjusted, e.g. by retarding these timings in conformance with the air-fuel ratio A/F.

More particularly, in case the brake is applied (the negative pressure or vacuum becomes insufficient) and in case the shortage of the brake operating pressure PB is of such magnitude that the predetermined level (corresponding to the permissible upper limit level) is not exceeded, the current lean mode is maintained, being modified as the supplementary lean mode. On the other hand, when the shortage of the brake operating pressure PB is of such magnitude that the above-mentioned predetermined level is attained or exceeded, the control mode is forcibly changed over to the stoichiometric mode by increasing the fuel supply quantity in order to ensure more positively the negative pressure for the brake operating pressure PB.

In the following, operation of the fuel control system for the cylinder injection type internal combustion engine according to the second embodiment of the invention will be elucidated by reference to FIGS. 4 to 6 together with FIG. 1.

Figure 4:
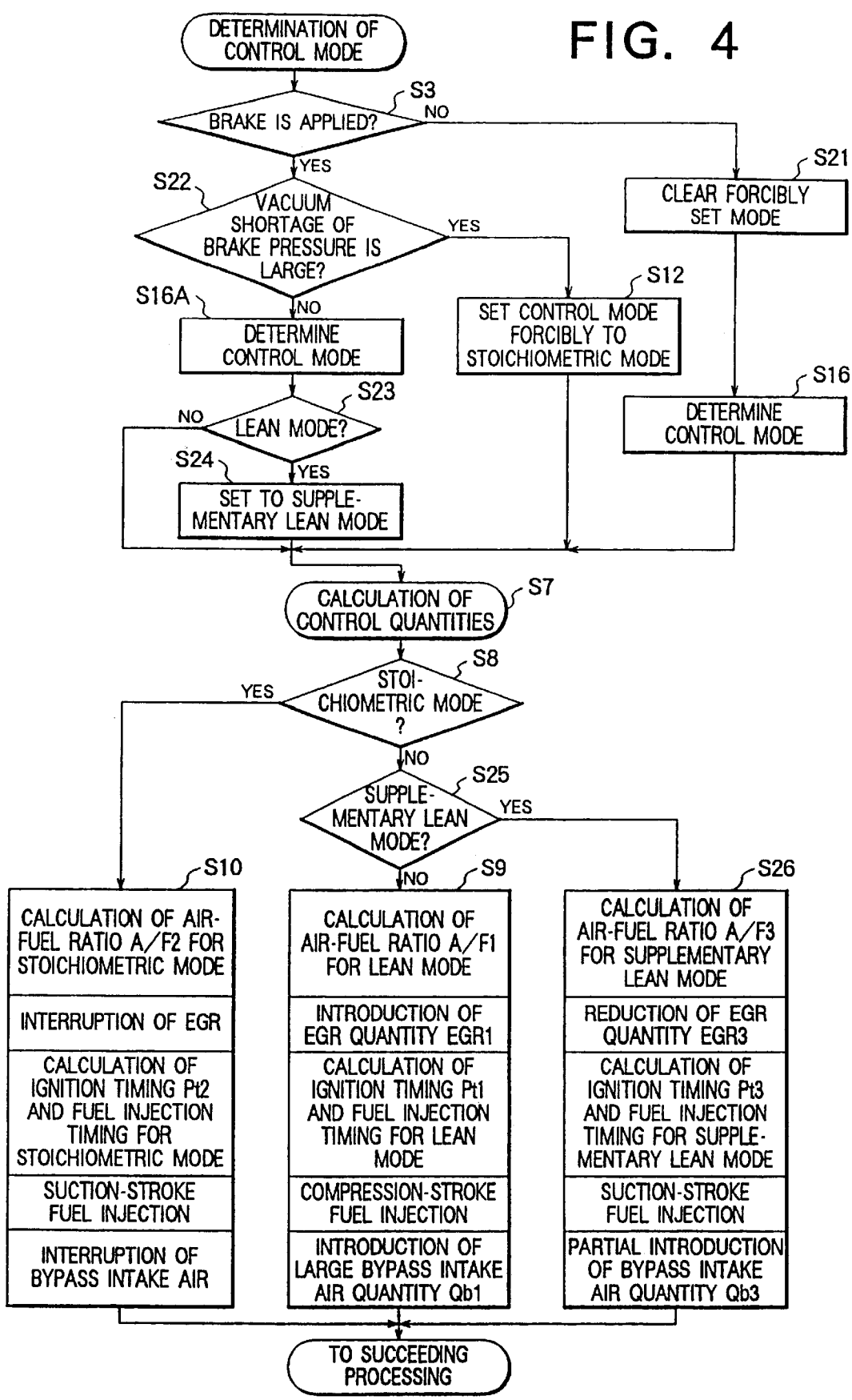

FIG. 4 is a flow chart for illustrating a control mode determining operation carried out by the control unit 8B of the fuel control system according to the instant embodiment of the invention, wherein processing steps S3, S7, S8, S9, S10, S12 and S16 are similar to those mentioned previously in conjunction with the first embodiment of the invention (see FIGS. 2 and 12).

Figure 5:
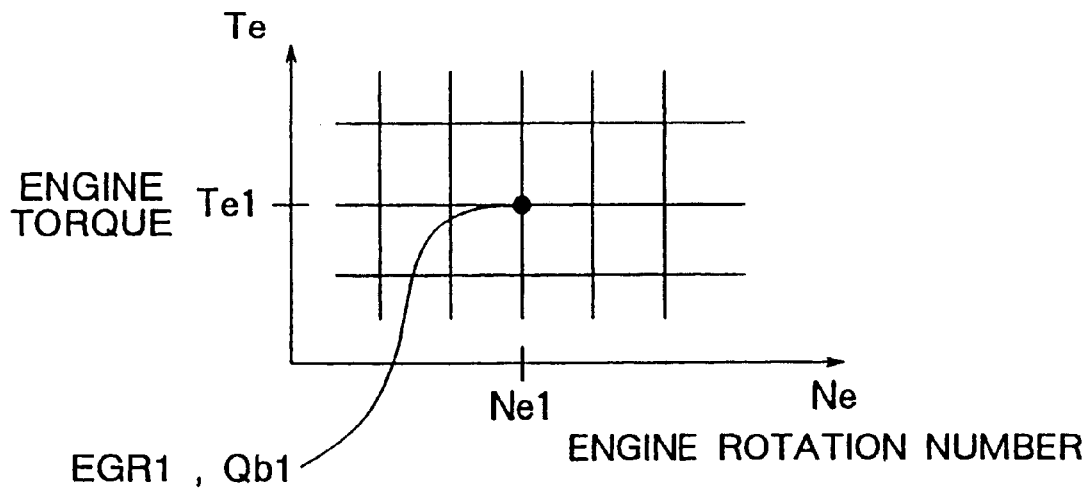
Figure 6:
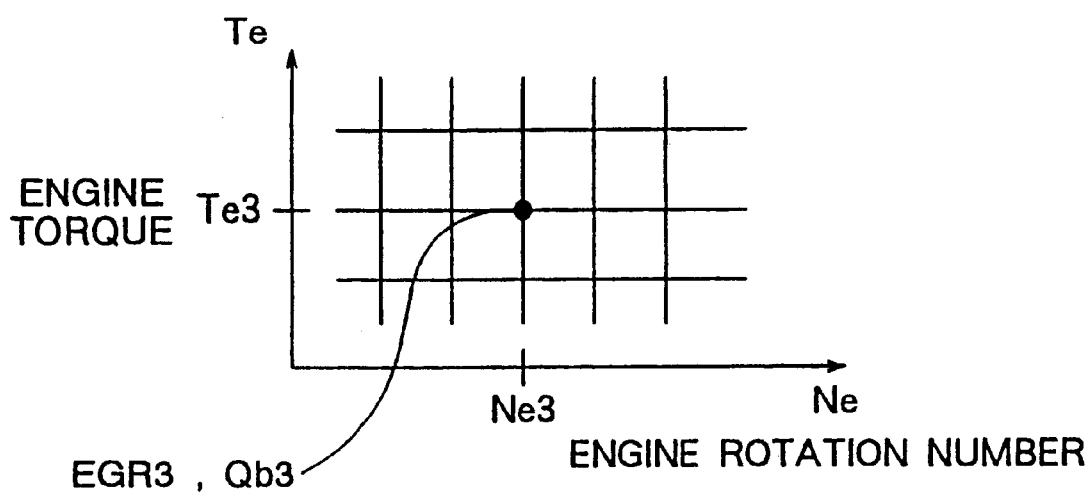

Further, FIGS. 5 and 6 are views for illustrating, by way of example only, arithmetic operations for determining control parameters such as the EGR quantity and the bypass intake air quantity Qb in the lean mode as well as in the supplementary lean mode (described hereinafter) by mapping.

More specifically, FIG. 5 is a view for illustrating determination of the EGR quantity EGR1 and the bypass intake air quantity Qb1 by mapping for an engine rotation number Ne1 (rpm) and an engine torque Te1 in the lean mode.

Further, FIG. 6 is a view for illustrating determination of the EGR quantity EGR3 and the bypass intake air quantity Qb3 by mapping for an engine rotation number Ne3 (rpm) and an engine torque Te3 in the supplementary lean mode.

Now, referring to FIG. 4, the control unit 8B (see FIG. 1) first decides whether or not the brake is applied (step S3).

When it is decided in the step S3 that the brake is not applied (i.e., when the decision step S3 results in "NO"), which means the state where the brake operating pressure PB (negative pressure) is not consumed, the forcibly set mode (i.e., the lean mode or the supplementary lean mode) is cleared (step S21). Thereafter, the current control mode is determined in a step S16, whereon the processing proceeds to a control quantity calculation processing (step S7).

On the other hand, when it is decided in the step S3 that the brake is applied (i.e., when the decision step S3 results in "YES"), then decision is made in a step S22 whether or not the shortage of the brake operating pressure PB is large (i.e., whether or not the brake operating pressure PB is higher than the predetermined level corresponding to the permissible upper limit level).

In practice, it is decided that the shortage of the negative pressure or vacuum is large when the brake operating pressure PB is higher than the predetermined level inclusive, as in the case of the step S11 in FIG. 2 mentioned previously.

When it is decided in the step S22 that the shortage of the brake operating pressure PB is large (i.e., the brake operating pressure PB is excessively insufficient), it is regarded that such shortage of the negative pressure can not thoroughly be corrected or compensated for with the supplementary lean mode. Thus, the control mode is forcibly set to the stoichiometric mode (step S12), whereon the processing proceeds to the control quantity calculation step S7.

By contrast, when it is decided in the step S22 that the vacuum level of the brake operating pressure PB is lower than the predetermined level (i.e., when the decision step S22 results in "NO"), the control unit 8B checks the current control mode (step S16A) to decide whether or not the current control mode is the lean mode (step S23).

When the current control mode is decided as the lean mode in the step S23 ("YES"), the control mode is set to the supplementary lean mode (step S24), whereon the processing proceeds to the step S7. On the other hand, when the current control mode is decided as not being the lean mode in the step S23 ("NO"), then the processing goes directly to the step S7.

Figure 14:
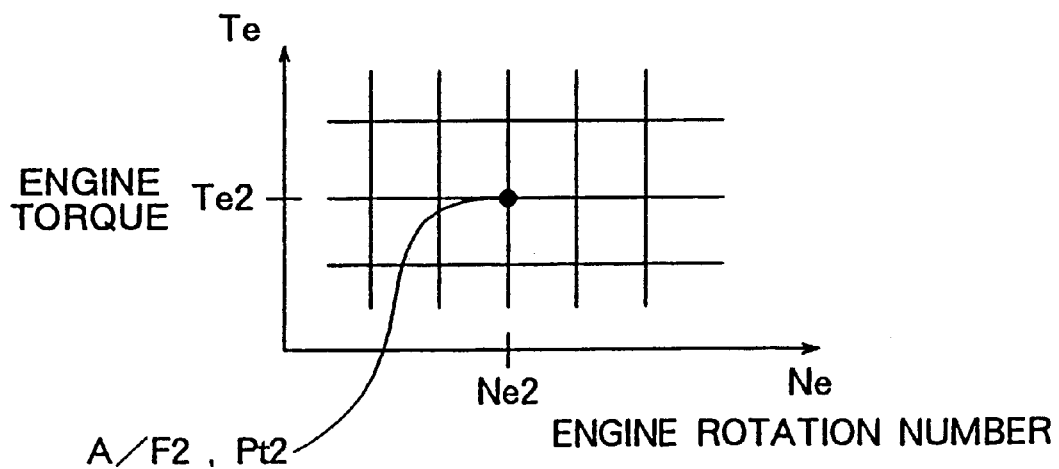
FIG. 14 is a view for illustrating arithmetic operation for determining control parameters in a stoichiometric mode as executed by the conventional control system.

Subsequently, decision is made as to whether or not the current control mode is the stoichiometric mode (step 8). If it is decided in the step S8 that the current control mode is the stoichiometric mode, the parameters for the stoichiometric mode are arithmetically determined in such manner as illustrated in FIG. 14 (step S10), and then the processing exits the routine shown in FIG. 4.

On the other hand, when it is decided in the step S8 that the current control mode is not the stoichiometric mode (i.e., when the step S8 results in "NO"), it is then decided in a step S25 whether or not the current control mode is the supplementary lean mode.

Figure 13:
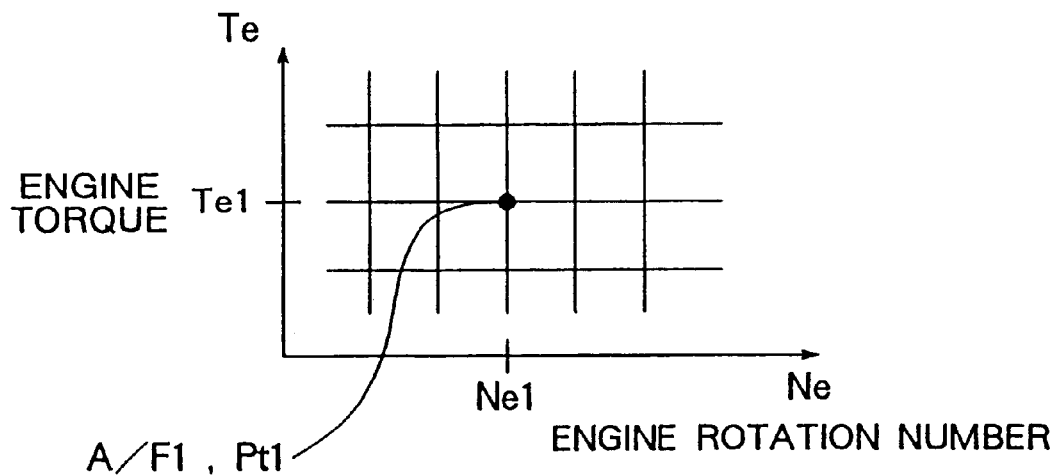
FIG. 13 is a view for illustrating arithmetic operation for determining control parameters in a lean mode as executed by the conventional control system.

When it is found in the step S25 that the current control mode is not the supplementary lean mode (i.e., when the step S25 results in "NO"), the parameters for the lean mode are determined in such manners as illustrated in FIGS. 5 and 13 described hereinbefore (step S9).

By contrast, when it is decided in the step S25 that the current control mode is the supplementary lean mode (i.e., the decision step S25 results in "YES"), the parameters for the supplementary lean mode (e.g. an EGR quantity EGR3 and a bypass intake air quantity Qb3) are determined in such manner as illustrated in FIG. 6 (step S26), and then the processing exits the routine shown in FIG. 4.

In the step S26 for arithmetically determining the parameters for the supplementary lean mode, the air-fuel ratio A/F3, the EGR quantity EGR3, the ignition timing Pt3 and the fuel injection mode for the supplementary lean mode are determined, whereon the fuel supply mode is changed over from the compression-stroke injection mode to the suction-stroke injection mode.

The air-fuel ratio A/F3 for the supplementary lean mode assumes an intermediate value between the air-fuel ratio A/F1 for the lean mode and the air-fuel ratio A/F2 for the stoichiometric mode, while the EGR quantity EGR3 in the supplementary lean mode is reduced when compared with the EGR quantity EGR1 in the lean mode. Further, the ignition timing Pt3 and the fuel injection timing in the supplementary lean mode are retarded relative to those in the lean mode.

Thus, when the shortage or insufficiency of the brake operating pressure in the lean mode is of such magnitude that the brake operating pressure does not exceed the predetermined level mentioned previously, the lean mode is carried out continuously as the supplementary lean mode while decreasing the intake air quantity Qa in order to ensure the negative pressure or vacuum sufficient for the brake operating pressure PB, while insufficiency of the engine output torque is compensated for by adjusting the control parameters, e.g. by decreasing the air-fuel ratio A/F3 in the supplementary lean mode (or by enriching of the air-fuel mixture, to say in another way).

Figure 7:
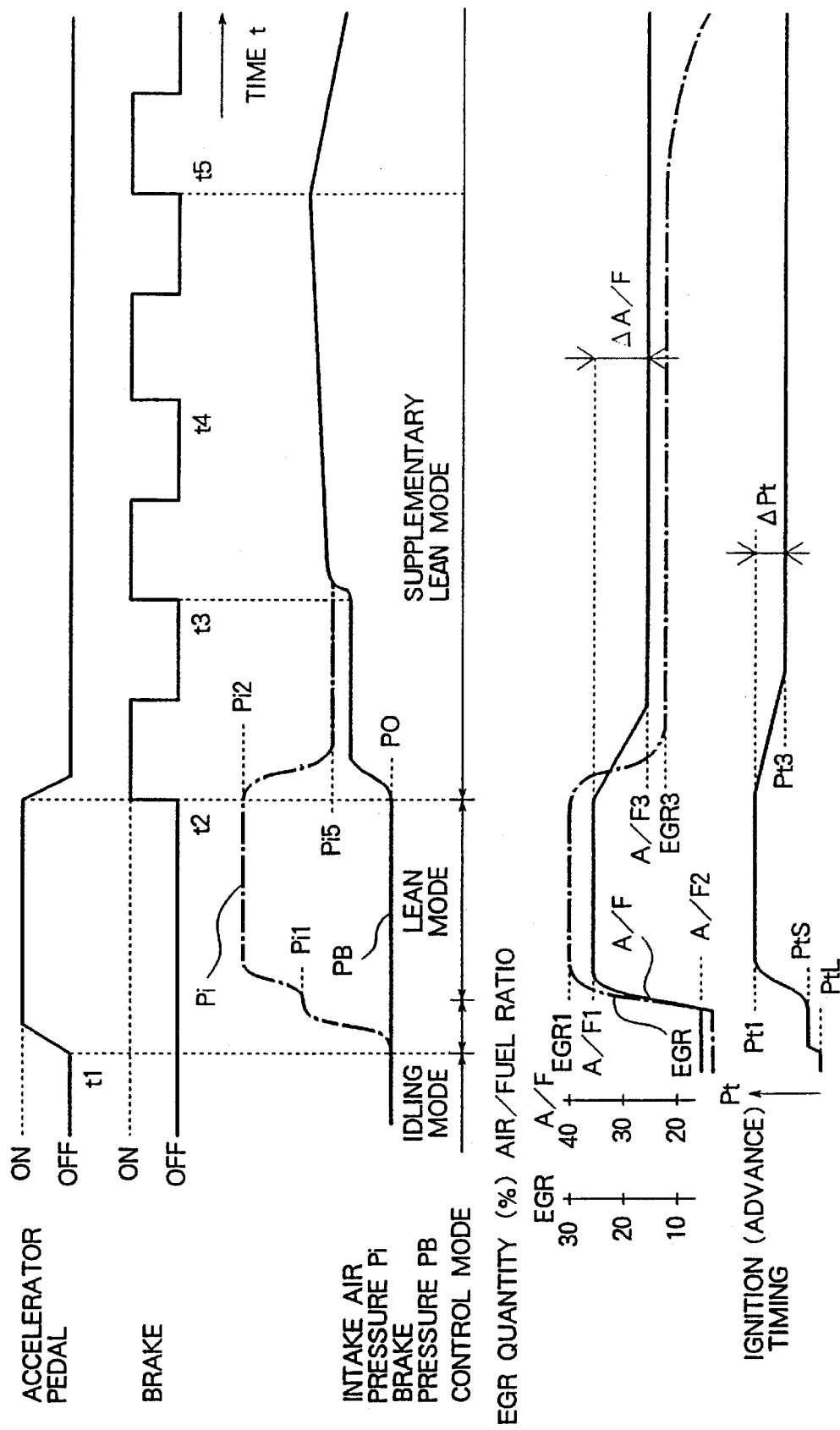

FIG. 7 is a timing chart for illustrating the operations described above as a function of time lapse. This figure corresponds to the timing chart shown in FIG. 3. Operations of the fuel control system according to the second embodiment of the invention will be described below by reference to FIG. 7.

The timing chart of FIG. 7 is depicted on the presumption that the supplementary lean mode is activated in succession to application of the brake (brake application) at the time point t2, whereby the EGR quantity is reduced to an EGR quantity EGR3 from an EGR quantity EGR1 to thereby lower the intake pressure from the pressure level Pi2 to the pressure level Pi5 with the air-fuel ratio being increased to the air-fuel ratio A/F3 for the supplementary lean mode from the air-fuel ratio A/F1 for the lean mode (i.e., the air-fuel mixture is enriched correspondingly).

Further, when the brake operating pressure PB is not supplemented sufficiently but increases gradually in the course of control in the supplementary lean mode, the EGR quantity is supplementarily reduced, starting from the time point t5 at which the brake operating pressure PB exceeds the predetermined level (corresponding to the permissible upper limit level) with the aim of ensuring sufficient vacuum for the brake operating pressure PB.

Incidentally, the fuel injection timing which bears correlation to the ignition timing Pt is omitted from illustration with only the change of the ignition timing Pt being shown representatively.

It is assumed that at the time point t2 shown in FIG. 7, the brake is applied in the lean mode. Then, the control mode is changed over to the above-mentioned supplementary lean mode to thereby set the EGR quantity EGR3 and the air-fuel ratio A/F3.

By way of example, the EGR quantity EGR3 for the supplementary lean mode may be set at ca. 10% in comparison with the EGR quantity of 0 (zero) % in the stoichiometric mode and the EGR quantity EGR1 of 30% in the lean mode.

Further, the air-fuel ratio A/F3 for the supplementary lean mode may be set at ca. 25 in comparison with the air-fuel ratio A/F2 of 14.7 in the stoichiometric mode and the air-fuel ratio A/F1 of 35 in the lean mode.

Figure 15:
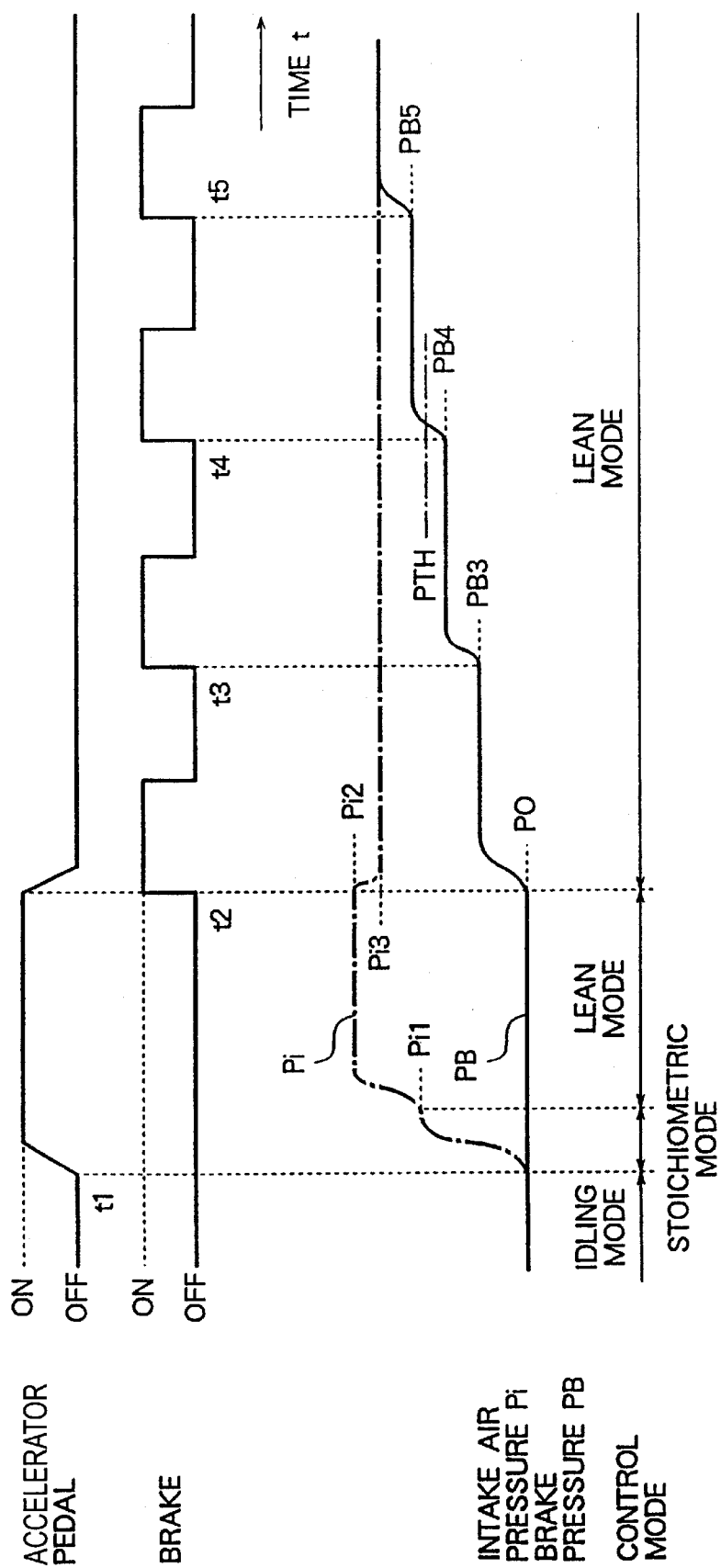
FIG. 15 is a timing chart for illustrating concretely typical control operations performed by the control unit incorporated in the conventional fuel control system for the cylinder injection type internal combustion engine shown in FIG. 11.
Figure 16:
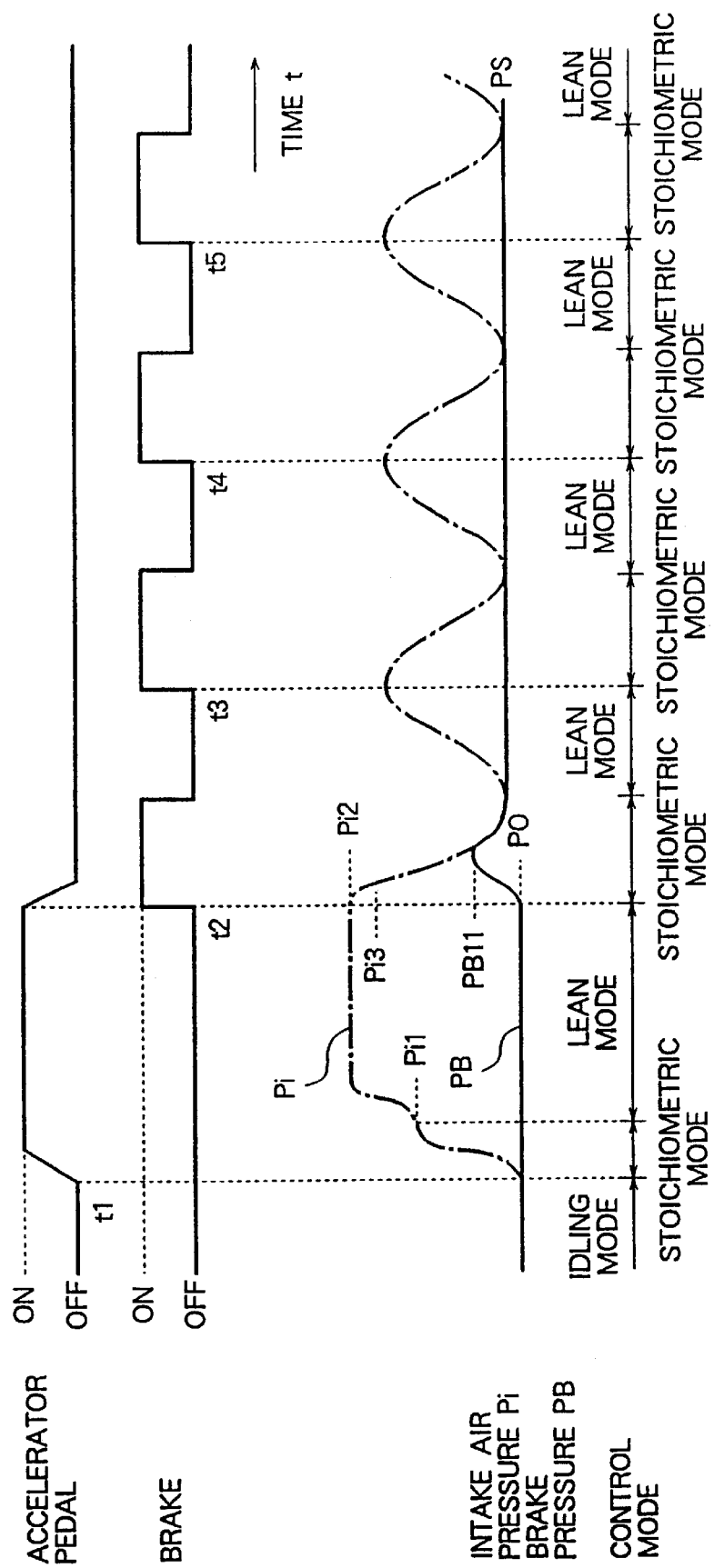
FIG. 16 is a timing chart for illustrating another example of control operations performed by the control unit incorporated in the conventional fuel control system for the cylinder injection type internal combustion engine.

In that case, the intake pressure Pi5 assumes an intermediate value between the intake pressure Pi4 in the stoichiometric mode (see FIG. 3) and the intake pressure Pi3 in the lean mode (see FIG. 15).

Further, because of correlation between the correcting quantity ΔPT for the ignition timing Pt and the correcting quantity ΔA/F for the air-fuel ratio A/F, the correcting quantity ΔPT is so set that the ignition timing Pt is retarded in correspondence to the reduction of the air-fuel ratio A/F (i.e., enriching of the air-fuel mixture). Consequently, the fuel injection timing is also retarded correspondingly, although not shown.

By activating the supplementary lean mode, the intake pressure Pi is reduced, whereby the vacuum of sufficient level can be ensured for the brake operating pressure PB.

However, when the intake pressure Pi increases gradually during the supplementary lean mode, resulting in that the brake operating pressure PB reaches or exceeds the predetermined level mentioned hereinbefore, the EGR quantity EGR quantity is supplementarily decreased for ensuring the vacuum for the brake operating pressure PB.

By activating or realizing the supplementary lean mode upon brake application, the frequency at which the control mode is changed over between the lean mode and the stoichiometric mode can be decreased significantly. Thus, the combustibility or combustion performance as well as the fuel-consumption performance of the engine can be protected against degradation.

Of course, unless the shortage of the negative pressure or vacuum can not be compensated for nevertheless of validation of the supplementary lean mode, the EGR quantity is decreased or alternatively the control mode is forcibly changed over to the stoichiometric mode, whereby the state in which the negative pressure is insufficient for actuation of the brake can be evaded.

By way of example, when difficulty is encountered in enriching the air-fuel mixture in view of the combustibility in the compression-stroke fuel injection (lean mode) or when it is desired to suppress abrupt change of the braking force in the state where the brake is being applied, this can be accomplished by reducing the EGR quantity EGR quantity. In that case, the ignition timing as well as the fuel injection timing may be controlled correspondingly so that comfortableness of driving the motor vehicle equipped with the fuel control system for the cylinder injection type internal combustion engine according to the invention can be ensured nevertheless of application of the brake.

Needless to say, unless the vacuum shortage can not be canceled out even by decreasing the EGR quantity, the control mode may be forcibly changed over to the stoichiometric mode.

Of course, when it is expected that the vacuum shortage can be compensated for by executing the supplementary lean mode without fail, neither the supplementary decreasing of the EGR quantity nor the transition to the forced stoichiometric mode is demanded.

Additionally, when either the decrease of the EGR quantity or the transition to the forced stoichiometric mode can promise elimination of the vacuum shortage, then it is sufficient to carry out either decreasing of the EGR quantity or setting of the forced stoichiometric mode.

In the supplementary lean mode, the negative pressure is compared with the predetermined level mentioned previously for determining whether or not the vacuum shortage occurs in the supplementary lean mode. However, the vacuum shortage state may equally be determined when the shortage of the brake operating pressure beyond the predetermined level has continued for a predetermined time.

Further, although it has been described that the supplementary lean mode is activated during the compression-stroke injection mode, the former may be validated during the suction-stroke injection mode in order to compensate for the output torque of the engine 1 with high reliability.

Embodiment 3

In the case of the fuel control system according to the second embodiment of the present invention, the decision as to shortage of the negative pressure or vacuum for the brake operating pressure is made in dependence on the brake applying operation. However, the vacuum shortage of the brake operating pressure may be decided by comparison with a predetermined level.

In the following, description will be directed to the fuel control system according to the third embodiment of the present invention, in which the state of the vacuum shortage for the brake operating pressure is decided through comparison with a predetermined level.

Figure 8:
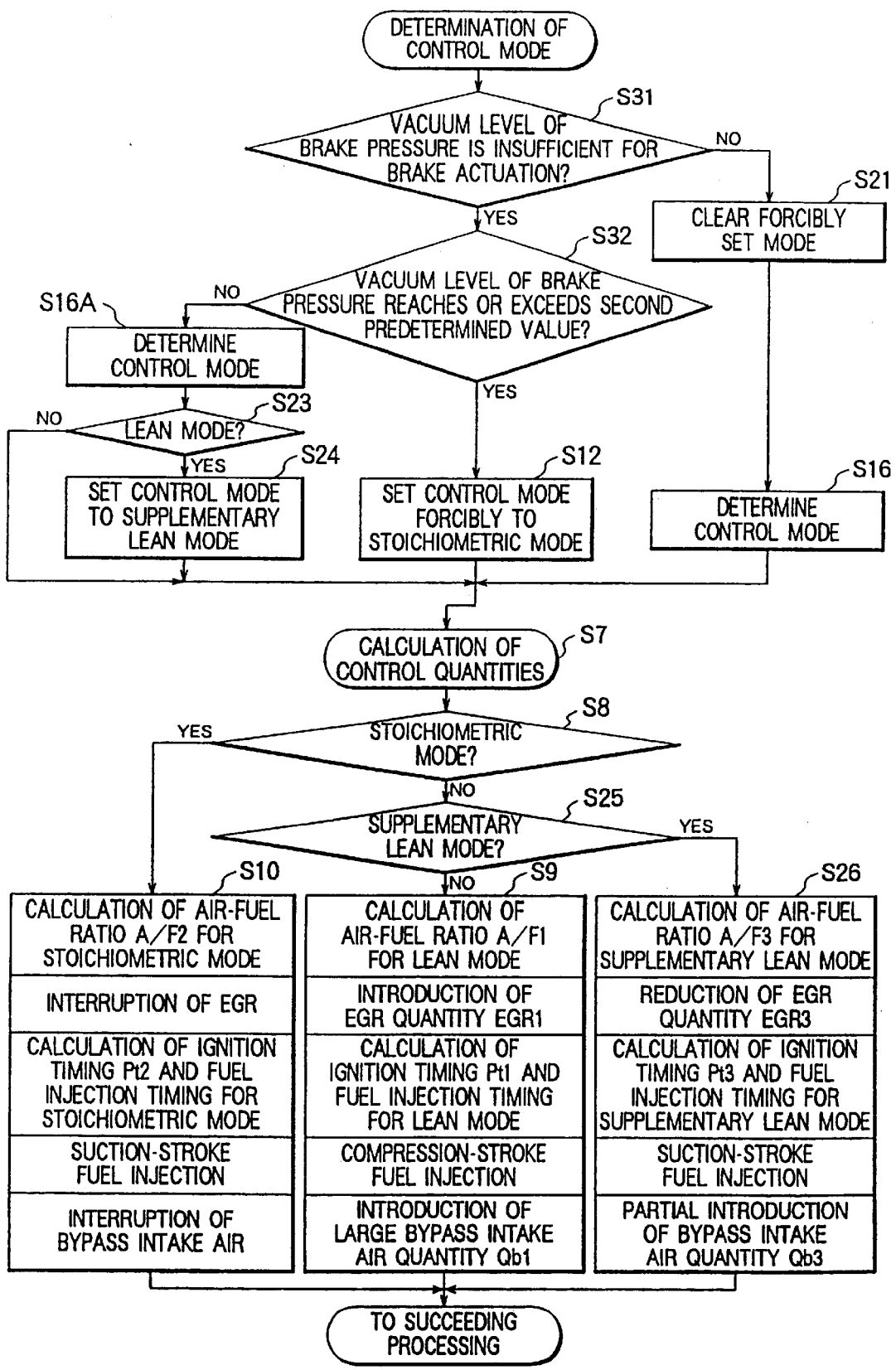
FIG. 8 is a flow chart for illustrating processing procedures executed by a control unit incorporated in the fuel control system according to a third embodiment of the present invention.

FIG. 8 is a flow chart for illustrating processing operations performed by the control unit 8B of the fuel control system according to the instant embodiment of the invention, wherein processing steps like as or equivalent to those described hereinbefore by reference to FIG. 2 or 4 are designated by like reference numerals and repeated description in detail of these steps is omitted.

In the flow chart shown in FIG. 8, step S31 and step S32 correspond, respectively, to the step S3 and the step S22 described hereinbefore by reference to FIG. 4.

In that case, the brake operating pressure PB is compared with a first predetermined level (permissible upper limit level) in the step S31 and when the brake operating pressure PB attains or exceeds the first predetermined level, then the brake operating pressure PB is further compared with a second predetermined level in the step S32. Only in this respect, the processing procedure of the third embodiment differs from the second embodiment of the invention.

At first, the control unit 8B compares the vacuum level of the brake operating pressure PB with the first predetermined level (corresponding to the permissible upper limit level) to decide whether or not the vacuum level of the brake operating pressure PB is insufficient for the brake actuation (step S31). Unless the vacuum level of the brake operating pressure PB is insufficient (i.e., when the decision step S31 results in "NO", the processing then proceeds to the forced stoichiometric mode clearing step S21.

On the other hand, when it is decided in the step S31 that the vacuum level of the brake operating pressure PB is insufficient (i.e., when the decision step S31 results in "YES"), then the former is again compared with the second predetermined level which is higher than the first predetermined level, to thereby decide whether or not the vacuum level of the brake operating pressure PB reaches or exceeds the second predetermined level (step S32).

When it is decided that the vacuum level of the brake operating pressure PB reaches or exceeds the second predetermined level (i.e., when the decision step S32 results in "YES"), the processing proceeds to the forced stoichiometric mode (step S12), whereas when the vacuum level is short of the second predetermined level (i.e., when the decision step S32 results in "NO"), then the current control mode is determined (steps S16A and S23). In case the current control mode is determined as the lean mode, then the supplementary lean mode described hereinbefore in conjunction with the second embodiment of the invention is validated (step S24).

Subsequently, the parameters corresponding to the control mode are arithmetically determined (step S9, step S10 or step S26), as described hereinbefore.

In case the vacuum level of the brake operating pressure PB reaches or exceeds the second predetermined level, then it is regarded that the shortage of vacuum can not be compensated for even when the supplementary lean mode is activated (step S24). Thus, the stoichiometric mode is forcibly activated (step S12).

Embodiment 4

In the case of the fuel control system according to the third embodiment of the present invention, degree of the vacuum shortage of the brake operating pressure which exceeds the first predetermined level is decided through comparison with the second predetermined level (step S32 in FIG. 8). However, such arrangement may be adopted that when the vacuum shortage state (i.e., the state of in which the vacuum level of the brake operating pressure is equal to or exceeds the predetermined level) has been continued for a period longer than a predetermined time in the course of the control in the supplementary lean mode, decision is then made that magnitude of the vacuum shortage for the brake operating pressure is large.

Now, description will be directed to the fuel control system according to the fourth embodiment of the present invention, which system is so designed as to make decision that the brake operating pressure is insufficient when the vacuum shortage state continues over a predetermined time point.

Figure 9:
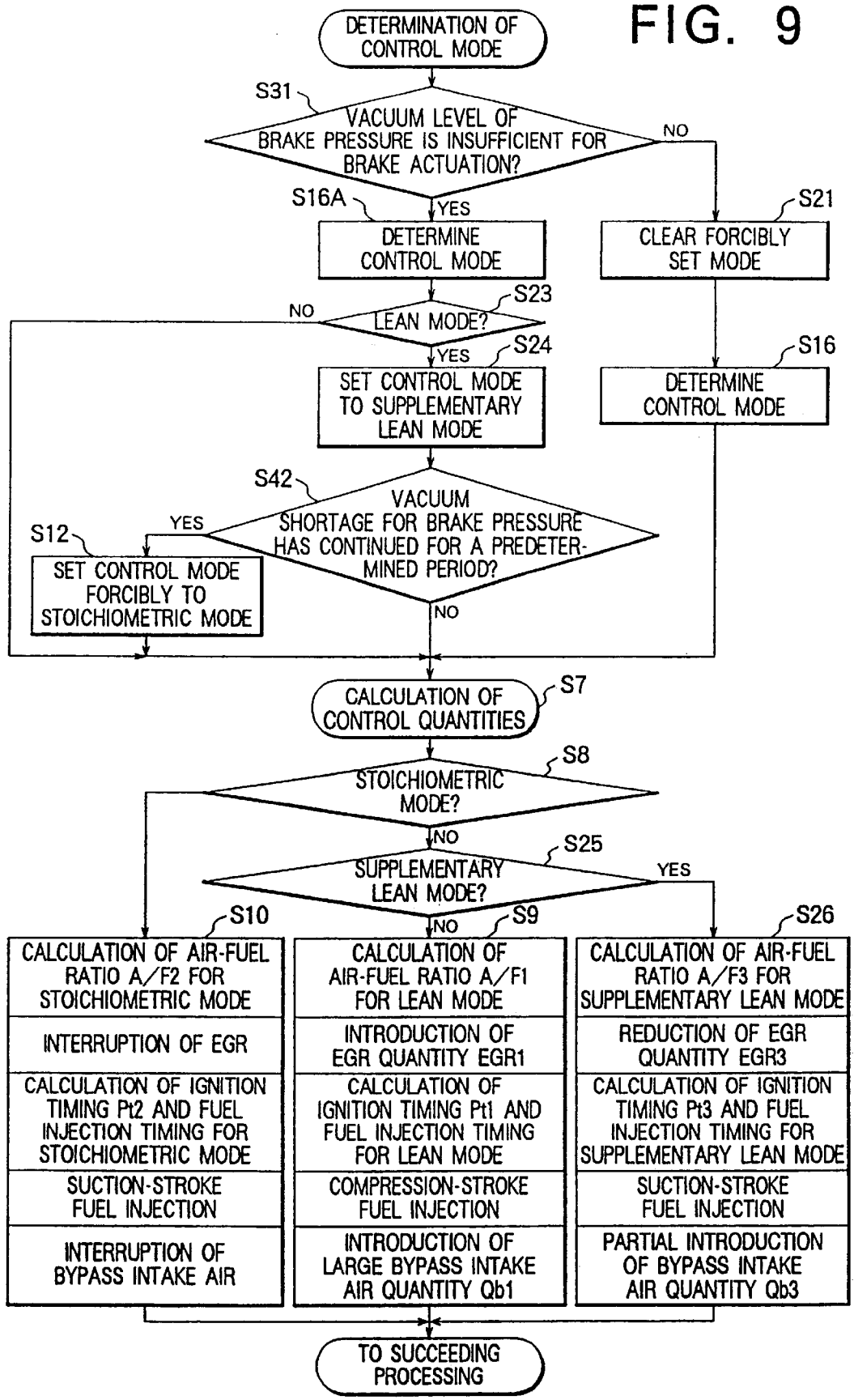
FIG. 9 is a flow chart for illustrating processing procedures executed by a control unit incorporated in the fuel control system according to a fourth embodiment of the present invention.

FIG. 9 is a flow chart for illustrating processing operations performed by the control unit 8B of the fuel control system according to the instant embodiment of the invention, wherein processing steps like as or equivalent to those described hereinbefore are designated by like reference numerals and repeated description of these steps is omitted. In the flow chart shown in FIG. 9, a processing step S42 corresponds to the step S32 described previously by reference to FIG. 8.

The control unit 8B decides in the step S31 the vacuum shortage state for the brake operating pressure PB, while deciding through the processings in the steps S16A and S23 that the current control mode is the lean mode. Further, in the course of execution of the supplementary lean mode (steps S24 and S26), decision is made in a step S42 which follows the step S24 as to whether or not the state of vacuum shortage for the brake operating pressure has continued for the predetermined time.

When it is decided in the decision step S42 that the state of vacuum shortage for the brake operating pressure PB (i.e., the state in which the vacuum level of the brake operating pressure is equal to or exceeds the predetermined level) has continued longer than the predetermined time (i.e., when the decision step S42 results in "YES"), then it is regarded that the vacuum shortage can not be compensated for by resorting to the supplementary lean mode (step S24). Thus, the control mode is forcibly changed over to the stoichiometric mode (step S12).

Subsequently, the parameters involved in the relevant control mode are arithmetically determined (step S9, step S10 or step S26), as described hereinbefore.

As can be appreciated from the above description, with the fuel control system according to the instant embodiment of the invention, the brake operating pressure PB can be ensured by reducing the intake air quantity Qa to the air-fuel ratio range in which the air-fuel mixture can undergo in the supplementary lean mode without changing over the control mode to the stoichiometric mode immediately upon occurrence of the vacuum shortage. Thus, it is possible to ensure the brake performance (negative pressure or vacuum) without degrading the combustion performance of the engine.

Besides, because improvement of the engine operation performance of the engine 1 can be realized with the aid of the control unit 8B, the instant embodiment of the invention can bring about advantageous actions and effects mentioned hereinbefore, needless to say.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been described that the fuel injection in the supplementary lean mode is carried out during the compression stroke, the former may equally be realized as the suction-stroke fuel injection.

Accordingly, all suitable modifications and equivalents may be resorted to, falling within the spirit and scope of the invention.

What is claimed is:

1. A fuel control system for a cylinder injection type internal combustion engine, comprising:
   various sensor means for outputting information signals indicative of operating states of said internal combustion engine;
   said mode changing means setting a supplementary lean mode having an air-fuel ratio which is between said lean air-fuel ratio and said stoichiometric air-fuel ratio when said insufficient quantity of said brake operating pressure is determined to be small, and setting said nearly stoichiometric air-fuel ratio suction-stroke fuel injection mode when said insufficient quantity of said brake operating pressure is determined to be large; and wherein said control means arithmetically determines said fuel supply quantity and said intake air quantity to be fed to each of said cylinders so as to make the air-fuel ratio correspond to the control mode that has been set.

2. A fuel control system for a cylinder injection type internal combustion engine according to claim 1, wherein:

said various sensor means include a brake switch; and said insufficient condition determining means determines the insufficient condition of said brake operating pressure based on the condition of said brake switch.

3. A fuel control system for a cylinder injection type internal combustion engine according to claim 1, wherein:

said various sensor; means include a pressure sensor means provided in said master bag; and fuel injector means for injecting fuel directly into each of cylinders of said internal combustion engine;

intake pipe means for supplying an intake air quantity to said internal combustion engine;

control means for selectively controlling said fuel injector means in a compression-stroke fuel injection mode having a lean air-fuel ratio or alternatively, in a suction-stroke fuel injection mode having a nearly stoichiometric air-fuel ratio on the basis of said engine operating states, and for arithmetically determining a fuel supply quantity and the intake air quantity to be fed to each of said cylinders according to said selected air fuel ratio; and a master bag for maintaining a brake operating pressure based on an intake pressure of said engine;

wherein said control means includes:

insufficient condition determining means for determining an insufficient condition of said brake operating pressure;

insufficient quantity determining means for determining an insufficient quantity of said brake operating pressure when said insufficient condition of said brake operating pressure is determined; and mode changing means for changing a control mode based on the results determined by said insufficient condition determining means and said insufficient quantity determining means while said engine is controlled in said lean air-fuel ratio compression-stroke fuel injection mode;

said insufficient condition determining means determines the insufficient condition of said brake operating pressure based on comparing the value detected by said pressure sensor means with a predetermined value.

4. A fuel control system for a cylinder injection type internal combustion engine according to claim 1, further comprising an exhaust gas recirculation valve means for adjusting an exhaust gas recirculating quantity recirculated from an exhaust pipe to said intake pipe means of said internal combustion engine, wherein:

said control means includes exhaust gas recirculation control means for arithmetically determining said exhaust gas recirculating quantity based on said engine operating conditions and for controlling and driving said exhaust gas recirculation valve means based on said exhaust gas recirculating quantity; and said exhaust gas recirculation control means sets:

the exhaust gas recirculating quantity during said nearly stoichiometric air-fuel ratio suction-stroke fuel injection mode to a value which is smaller than the exhaust gas recirculating quantity during said lean air-fuel ratio compression-stroke fuel injection mode, the exhaust gas recirculating quantity during said supplementary lean mode to a value between that of said nearly stoichiometric air-fuel ratio suction-stroke fuel injection mode and said lean air-fuel ratio compression-stroke fuel injection mode and said lean air-fuel ratio compression-stroke fuel injection mode.

5. A fuel control system for a cylinder injection type internal combustion engine according to claim 1, further comprising:

an intake air quantity adjusting means provided in said intake pipe means of said engine;

wherein said control means controls and drives said intake air quantity adjusting means based on the intake air quantity arithmetically determined in response to each control mode, and wherein said control means controls and drives said intake air quantity adjusting means so as to decrease the intake air quantity for supplementing the air-fuel ratio in the enriching direction when said control mode is changed to said supplementary lean mode from said lean air-fuel ratio compression-stroke fuel injection mode.

6. A fuel control system for a cylinder injection type internal combustion engine according to claim 1, wherein said control means executes said supplementary lean mode in a compression-stroke fuel injection mode.

7. A fuel control system for a cylinder injection type internal combustion engine according to claim 1, wherein said control means executes said supplementary lean mode in a suction-stroke fuel injection mode.

* * * * *